US008422878B2

(12) United States Patent
Park et al.

(10) Patent No.: US 8,422,878 B2
(45) Date of Patent: Apr. 16, 2013

(54) IMAGING APPARATUS PERFORMING AUTO FOCUSING FUNCTION WITH PLURALITY OF BAND PASS FILTERS AND AUTO FOCUSING METHOD APPLIED TO THE SAME

(75) Inventors: Kyong-Tae Park, Suwon-si (KR); Jeong-Won Lee, Seongnam-si (KR); Kyoung-Hwan Moon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 50 days.

(21) Appl. No.: 13/043,877

(22) Filed: Mar. 9, 2011

(65) Prior Publication Data
US 2011/0236007 A1 Sep. 29, 2011

(30) Foreign Application Priority Data

Mar. 23, 2010 (KR) .................. 10-2010-0025737

(51) Int. Cl.
*G03B 17/00* (2006.01)
*G03B 13/00* (2006.01)
(52) U.S. Cl.
USPC .............................. 396/128; 396/77; 348/354

(58) Field of Classification Search ............ 396/77, 396/128; 348/354
See application file for complete search history.

(56) References Cited

U.S. PATENT DOCUMENTS

| 5,070,353 | A | * | 12/1991 | Komiya et al. ............... 396/101 |
| 5,083,150 | A | * | 1/1992 | Nagasaki et al. ............... 396/49 |
| 5,212,516 | A | * | 5/1993 | Yamada et al. ............... 348/354 |
| 5,353,089 | A | * | 10/1994 | Yaji ................................ 348/353 |
| 6,512,549 | B1 | * | 1/2003 | Iijima et al. .................. 348/349 |
| 2009/0066830 | A1 | * | 3/2009 | Fujii et al. ..................... 348/345 |
| 2010/0188558 | A1 | * | 7/2010 | Gamadia et al. ............. 348/345 |

* cited by examiner

*Primary Examiner* — Rodney Fuller
(74) *Attorney, Agent, or Firm* — The Farrell Law Firm, P.C.

(57) ABSTRACT

An imaging apparatus and an auto focusing method are provided. A plurality of focus signal values are calculated for a plurality of frequency bands of a captured image signal. An amount of defocus of a focus lens is calculated based on focus signal values calculated for two positions. A position of the focus lens is controlled depending on the calculated amount of defocus. Thereby, the imaging apparatus can detect a focus at higher speed.

22 Claims, 16 Drawing Sheets

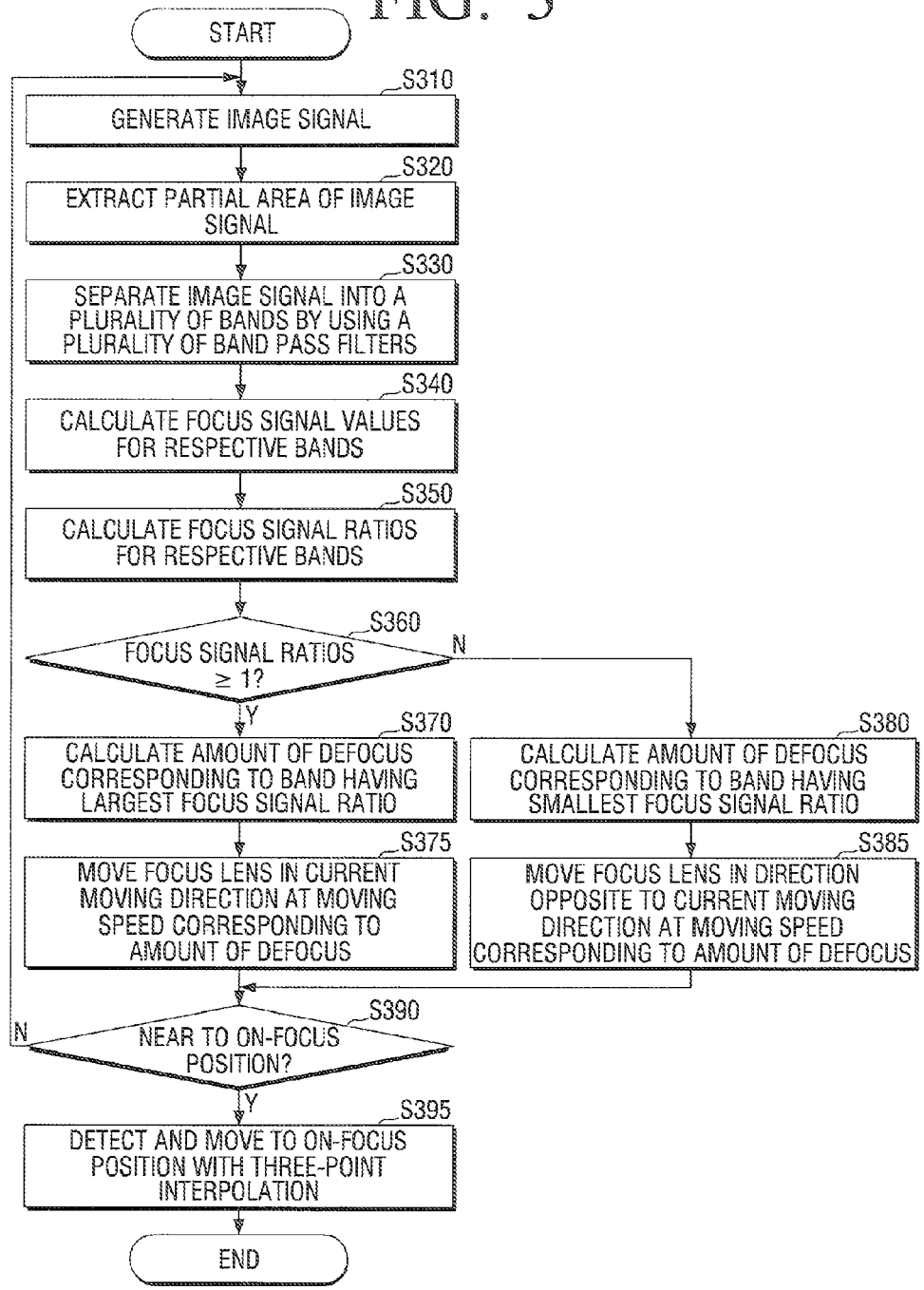

IMAGING APPARATUS PERFORMING AUTO FOCUSING FUNCTION WITH PLURALITY OF BAND PASS FILTERS AND AUTO FOCUSING METHOD APPLIED TO THE SAME

CROSS-REFERENCE TO RELATED APPLICATIONS

This application claims priority from Korean Patent Application No. 10-2010-0025737, filed on Mar. 23, 2010, in the Korean Intellectual Property Office, the disclosure of which is incorporated herein by reference in its entirety.

BACKGROUND OF THE INVENTION

1. Field of the Invention

The present invention relates auto focusing such as for an imaging apparatus.

2. Description of the Related Art

Recently, as multimedia apparatuses and Internet connectivity have become increasingly widespread, it has become easier for users to store photographs they have taken on multimedia apparatuses or to upload the photographs to Internet blogs. Consequently, camera ownership has risen in recent years.

Modern cameras support an automatic focusing (AF) function, which enables automatic focus adjustment. In general, AF systems use a contrast method or phase difference detection method.

The phase different detection method can focus in a short time. However, a dedicated detection apparatus is required with a separate optic system that guides light for focus detection. The phase difference detection method is generally used in a digital single-lens reflex (DSLR) camera.

Since the contrast method does not require a separate space, it is mainly used in a small-sized compact camera. However, since the contrast method cannot directly measure an amount of defocus, the measurement should be repeated several times.

SUMMARY OF THE INVENTION

An object of the invention is to provide an imaging apparatus and focusing method that calculates a plurality of focus signal values for a plurality of bands of a captured image signal, calculates an amount of defocus of a focus lens, based on focus signal values calculated for two positions, and controls a position of the focus lens depending on the calculated amount of defocus.

In order, to achieve the object, an imaging apparatus according to one embodiment of the invention includes a lens unit including an optical system having a focus lens; a driving unit that drives the lens unit; an image pickup unit that detects light having passed through the lens unit to generate an image signal; an auto focusing unit that calculates and outputs a plurality of focus signal values for a plurality of frequency bands of the image signal generated in the image pickup unit; and a control unit that calculates an amount of defocus of the focus lens, based on first focus signal values, which are the plurality of focus signal values at a first position of the focus lens, and second focus signal values, which are the plurality of focus signal values at a second position of the focus lens, and controls the driving unit so that a position of the focus lens is moved depending on the calculated amount of defocus.

An auto focusing method according to exemplary embodiment includes detecting light having passed through a lens unit to generate an image signal; calculating a plurality of focus signal values for a plurality of frequency bands of the generated image signal; calculating an amount of defocus of the focus lens, based on first focus signal values, which are the plurality of focus signal values at a first position of the focus lens, and second focus signal values, which are the plurality of focus signal values at a second position of the focus lens; and driving the focus lens so that a position of the focus lens is moved depending on the calculated amount of defocus.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features, aspects and benefits of the embodiments of the invention will become apparent and more readily appreciated from the following description of the embodiments, taken in conjunction with the accompanying drawings, of which:

FIG. 3 is a flow chart showing an auto focusing method according to an exemplary embodiment of the invention;

DETAILED DESCRIPTION OF EXEMPLARY EMBODIMENTS

Figure 1:
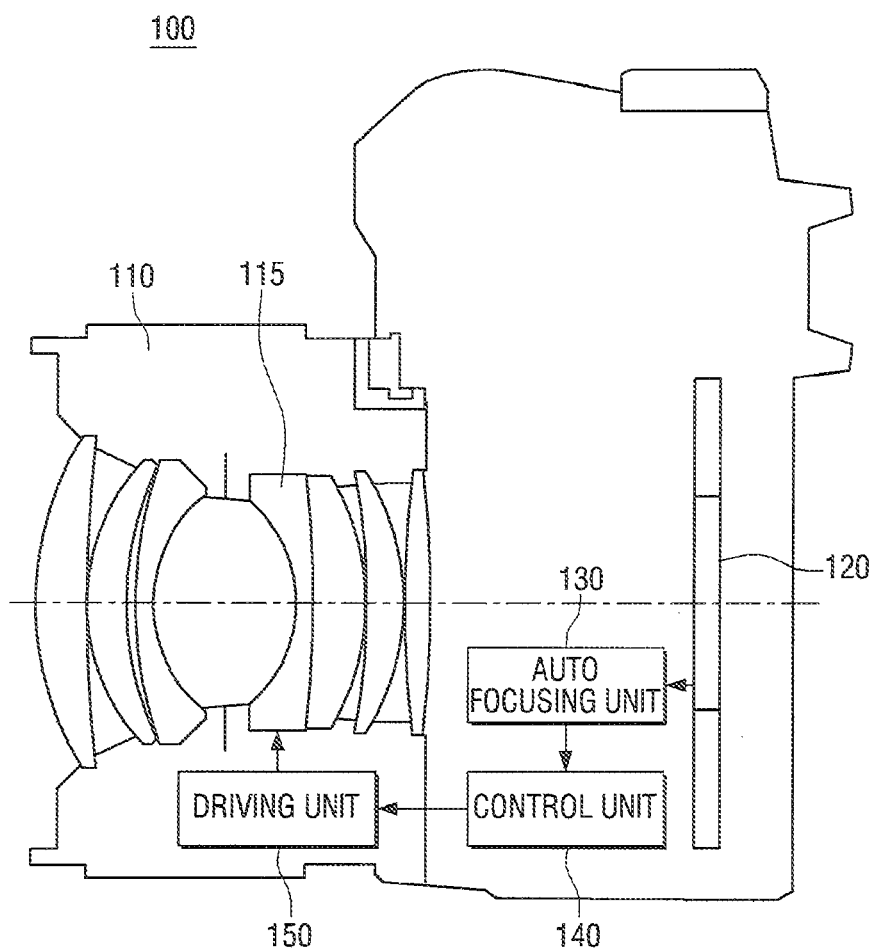
FIG. 1 is a block diagram showing a configuration of a camera according to an exemplary embodiment of the invention.

Certain embodiments of the present invention will now be described in greater detail With reference to the accompanying drawings.

In the following description, same drawing reference numerals are used for the same elements even in different drawings. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

FIG. 1 is a block diagram showing a configuration of a camera 100 having an auto focusing device according to an exemplary embodiment of the invention. As shown in FIG. 1, the camera may include a lens unit 110, an image pickup unit 120, an auto focusing unit 130, a control unit 140 and a driving unit 150.

The lens unit 110 may gather light from a subject and form an image on the image pickup unit 120. The lens unit 110 may consist of an optic system including a plurality of lenses, which lenses are formed into optical groups according to their functions. The lens unit 110 may include a focus lens 115 that performs a focusing function.

The position for the focus lens 115 may be moved to focus the lens unit 110. To be more specific, the driving unit 150 may move the focus lens 115 to an on-focus position.

The image pickup unit 120 may detect light having passed through the lens unit 110 to generate an image signal about a subject image. For a film camera, a film is put on the image pickup unit 120. However, for a digital camera, image sensors are arranged on the image pickup unit 120. In this exemplary embodiment, a digital camera will be described as an example.

Image sensors for exposing a subject image may be disposed on the image pickup unit 120. Image sensors typically used in digital cameras broadly speaking may include, for example, charge-coupled devices (CCD) and complementary metal-oxide-semiconductors (CMOS), which differ in their technical mechanism but operate on substantially the same basic principle.

The image pickup unit 120 transmits the generated image signal to the auto focusing unit 130.

The auto focusing unit 130 may calculate and output a plurality of focus signal values for a plurality of bands of the image signal generated in the image pickup unit 120, with respect to a specific position of the focus lens 115. The auto focusing unit 130 will be specifically described below with reference to FIG. 2.

Figure 2:
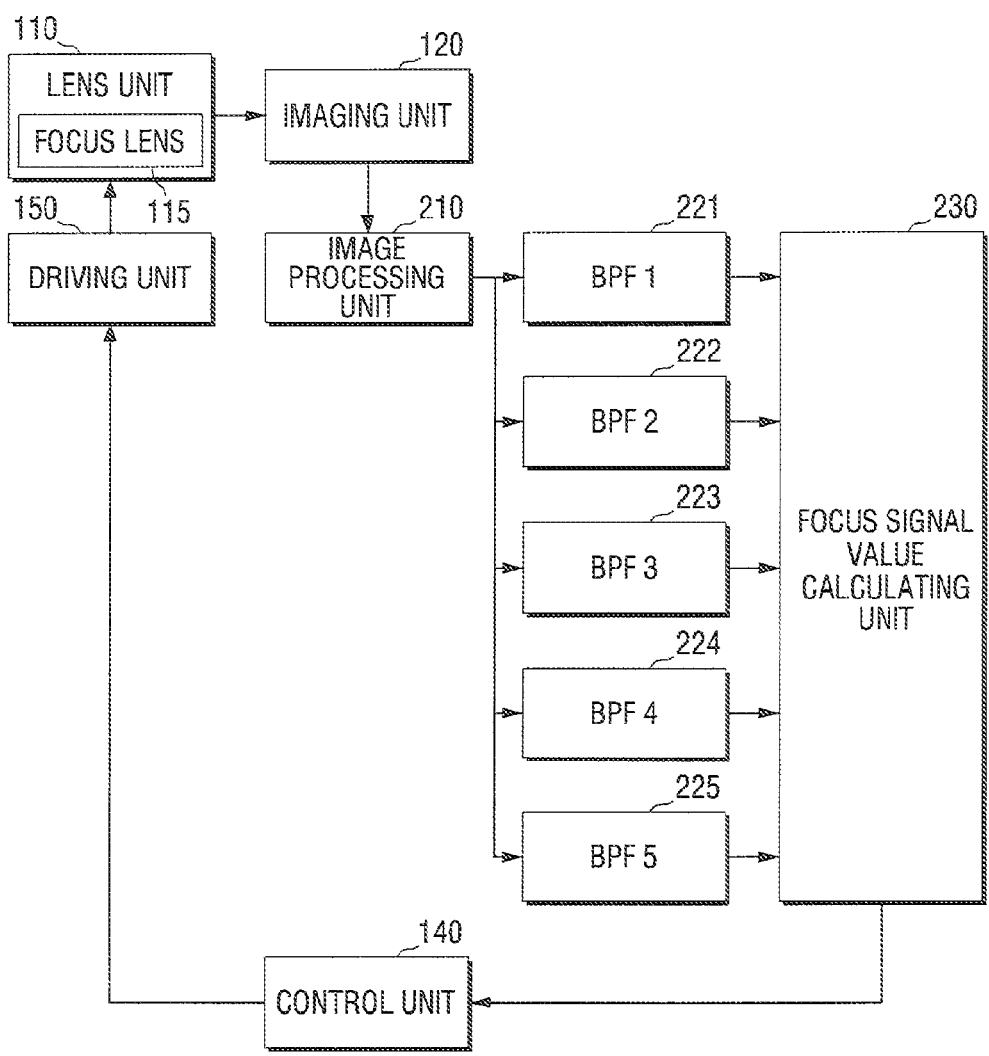
FIG. 2 is a block diagram showing a detailed configuration of a camera according to an exemplary embodiment of the invention.

FIG. 2 is a block diagram showing a detailed configuration of the camera 100 according to an exemplary embodiment of the invention. As shown in FIG. 2, the auto focusing unit 130 may include an image processing unit 210, a plurality of band pass filters 221 to 225 and a focus signal value calculating unit 230.

The image processing unit 210 may extract a partial area of the image signal generated in the image pickup unit 120. Herein, the partial area of the generated image signal indicates a part that is used for focus detection. The camera may be adapted to focus a partial area of the captured image, in general, a partial area of a central part of a screen. However, the invention is not limited thereto. For example, the camera may be adapted to detect a focus for various parts of a captured image signal. The camera 100 may focus the partial area extracted by the image processing unit 210, thereby reducing calculations for auto focusing and increasing focusing speed.

The band pass filters 221 to 225 may pass different bands of the processed image signal, respectively. Specifically, the band pass filters 221 to 225 may have a same band width and intermediate frequencies thereof may be sequentially increased from the lowest frequency at a predetermined interval. For example, it is assumed that the band pass filters include BPF1 221 to BPF5 225 and the respective filters have a band width of 5 lp/mm and intermediate frequencies thereof are 5 lp/mm, 10 lp/mm, 15 lp/mm, 20 lp/mm and 25 lp/mm, respectively. Thus, a pass band of the BPF1 221 is 2.5 to 7.5 lp/mm, a pass band of the BPF2 222 is 7.5 to 12.5 lp/mm, a pass band of the BPF3 223 is 12.5 to 17.5 lp/mm, a pass band of the BPF4 224 is 17.5 to 22.5 lp/mm and a pass band of the BPF5 225 is 22.5 to 27.5 lp/mm.

Since a focus signal of a low frequency band has a wide peak width, it may be useful for calculation of a driving direction of the focus lens 115. Since a focus signal of a high frequency band has a narrow peak width at an on-focus position, it may be useful for precise focus detection. Accordingly, when an auto focusing function is performed using a plurality of band pass filters, both low and high frequency bands of the focus signal can be used, so that it is possible to perform a more precise auto focusing.

However, it should be noted that the number, the intermediate frequencies and band widths of the band pass filters are not limited to the above and can be variously changed.

The focus signal value calculating unit 230 may be input with image signals of the respective bands having passed through the band pass filters 221 to 225. For example, in FIG. 2, the focus signal value calculating unit 230 receives the image signals of five bands from the five band pass filters.

Then, the focus signal value calculating unit 230 may calculate focus signal values for the image signals of respective bands. In other words, the focus signal value calculating unit 230 may calculate one focus signal value for an image signal of a band having passed through one of the band pass filters. Therefore, the number of focus signal values generated by the focus signal value calculating unit 230 may be the same as the number of the band pass filters.

For example, in FIG. 2, the focus signal value calculating unit 230 generates five focus signal values, i.e., a focus signal value a for an image signal having passed through BPF1 221, a focus signal value b for an image signal having passed through BPF2 222, a focus signal value c for an image signal having passed through BPF3 223, a focus signal value d for an image signal having passed through BPF4 224 and a focus signal value e for an image signal having passed through BPF5 225.

Herein, the focus signal values may be used to detect a focus and one value is calculated for an image signal of one band. To be more specific, the focus signal value may be a contrast value. This is to perform auto focusing by the contrast method.

The auto focusing unit 130 having the configuration as described above may calculate focus signal values for a plurality of bands with respect to a specific position of the focus lens 115. Then, the auto focusing unit 130 may transmit the calculated focus signal values to the control unit 140.

The control unit 140 may receive the focus signal values calculated in the auto focusing unit 130. The control unit 140 may calculate amounts of defocus of the focus lens 115, based on first focus signal values, which are focus signal values at a first position of the focus lens 115, and second focus signal values, which are focus signal values at a second position of the focus lens 115, and may control the driving unit 150 so that a position of the focus lens 115 is moved depending on the calculated amounts of defocus. Here, the amount of defocus is a value indicating a degree of deviation of the focus lens 115 from an on-focus position (i.e., in focus position).

Specifically, the control unit 140 may receive the first focus signal values from the auto focusing unit 130 while the focus lens 115 is at a first position. Then, the control unit 140 may control the driving unit 150 so that the focus lens 115 is moved to a second position. Then, the control unit 140 may receive the second focus signal values from the auto focusing unit 130 while the focus lens 115 is at the second position. In other words, the first position is a previous position of the focus lens 115 and the second position is a current position of the focus lens 115.

After that, the control unit 140 may calculate a focus signal ratio (second focus signal value/first focus signal value) that is a ratio of the second focus signal value to the first focus signal value for each of the bands. In other words, one focus signal ratio per each band may be calculated. For example, when five band pass filters 221 to 225 are included as shown in FIG. 2, the number of bands is five, so that the control unit 140 calculates five focus signal ratios. Thus, the control unit 140 calculates the focus signal ratio values for each band with respect to two positions of the focus lens 115.

For example, it is assumed as follows: while the focus lens 115 is at the first position, the focus signal value calculating unit 230 may generate a focus signal value a1 for an image signal having passed through BPF1 221, a focus signal value b1 for an image signal having passed through BPF2 222, a focus signal value c1 for an image signal having passed through BPF3 223, a focus signal value d1 for an image signal having passed through BPF4 224 and a focus signal value e1 for an image signal having passed through BPF5 225, and while the focus lens 115 is at the second position, the focus signal value calculating unit 230 may generate a focus signal value a2 for an image signal having passed through BPF1 221, a focus signal value b2 for an image signal having passed through BPF2 222, a focus signal value c2 for an image signal having passed through BPF3 223, a focus signal value d2 for an image signal having passed through BPF4 224 and a focus signal value e2 for an image signal having passed through BPF5 225. Then, the control unit 140 may calculate a2/a1, b2/b1, c2/c1, d2/d1 and e2/e1, as focus signal ratios for respective bands.

Then, the control unit 140 may determine whether the focus signal ratios are larger than or equal to 1 or smaller than 1. In this case, accuracy is high when it is determined whether the focus signal ratio of a low frequency band is larger than or equal to 1 or smaller than 1. This is because a focus signal of a low frequency band has a gentle peak and less noise. Accordingly, the control unit 140 may determine whether a focus signal ratio for the lowest frequency band of a plurality of bands is larger than or equal to 1 or smaller than 1.

When the focus signal ratios are larger than or equal to 1, it indicates that movement of the focus lens 115 from the first position to the second position is in a direction approaching the on-focus position. When the focus signal ratios are smaller than 1, it indicates that a movement of the focus lens 115 from the first position to the second position is in a direction away from the on-focus position.

Accordingly, when the focus signal ratios are larger than or equal to 1, the control unit 140 may cause the focus lens 115 to be driven in a direction from the first position to the second position. To the contrary, when the focus signal ratios are smaller than 1, the control unit 140 may cause the focus lens 115 to be driven in a direction opposite to the moving direction from the first position to the second position.

Thus, the control unit 140 may determine the driving direction of the focus lens depending on whether the focus signal ratios for the plurality of bands are larger than or equal to 1 or smaller than 1.

In addition, when the focus signal ratios for the plurality of bands are larger than or equal to 1, the control unit 140 may calculate an amount of defocus corresponding to a band having the largest focus signal ratio. To the contrary, when the focus signal ratios for the plurality of bands are smaller than 1, the control unit 140 may calculate an amount of defocus corresponding to a band having the smallest focus signal ratio.

Figure 6:
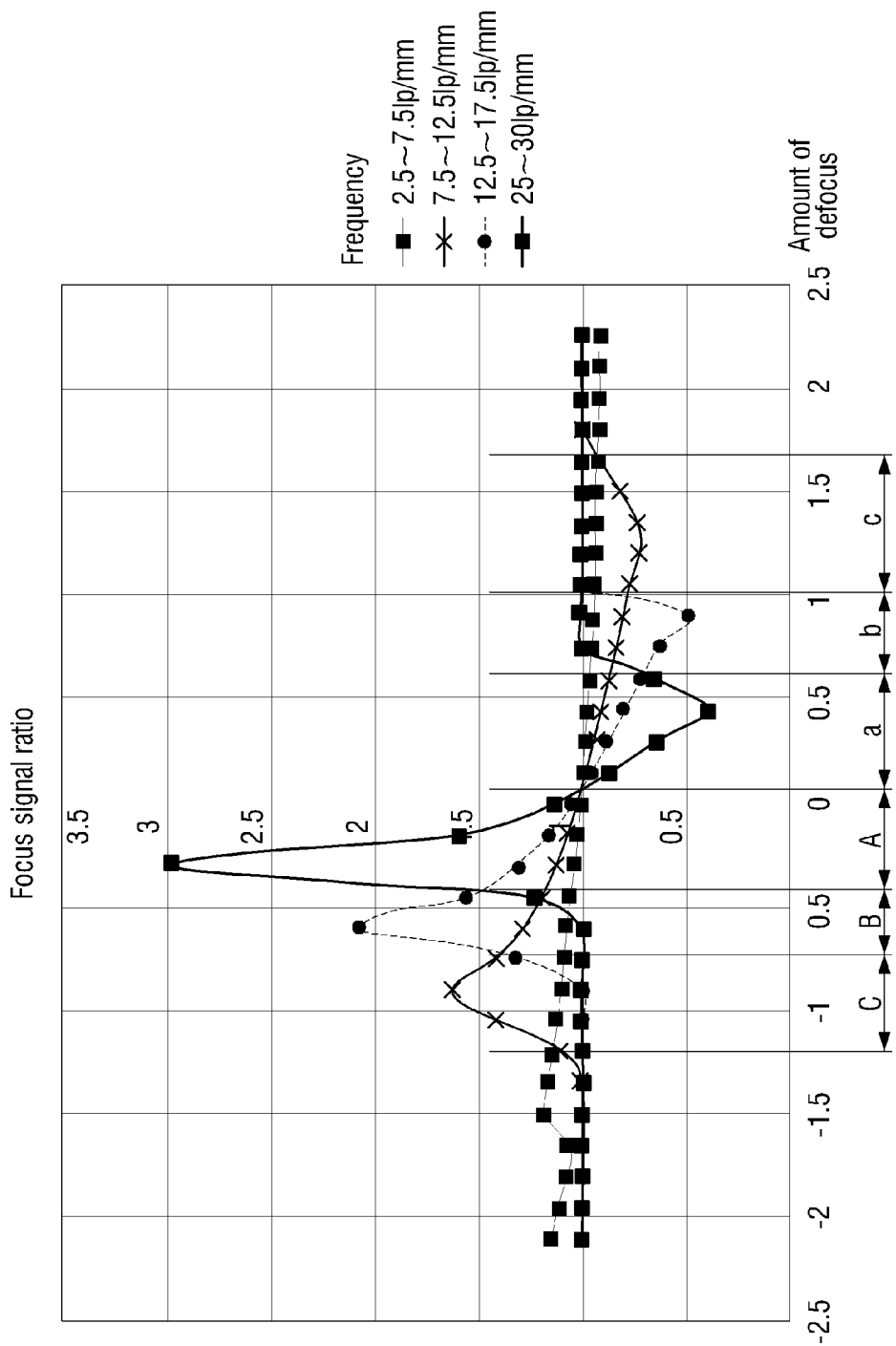
FIG. 6 is a graph showing focus signal ratios depending on focus lens positions in four frequency bands according to an exemplary embodiment of the invention.

The principle of determining a moving direction of the focus lens 116 and calculating an amount of defocus by the control unit 140 will be specifically described with reference to FIG. 6. FIG. 6 is a graph showing focus signal ratios depending on positions of the focus lens 115 in four frequency bands.

In FIG. 6, an x axis of the graph indicates amounts of defocus, a y axis indicates focus signal ratios and the four lines indicate ratios for four frequency bands. Here, a position at which an amount of defocus is zero indicates an on-focus position.

As shown in FIG. 6, it can be seen that the focus signal ratios are larger than 1 in a left side (an area in which an amount of defocus is minus) of the on-focus position (at which an amount of defocus is zero) and the focus signal ratios are smaller than 1 in a right side (an area in which an amount of defocus is plus). In other words, it can be seen that when the focus signal ratios are larger than 1, the moving direction from the first position to the second position (the current moving direction) of the focus lens 115 is a direction approaching the on-focus position. To the contrary, it can be seen that when the focus signal ratios are smaller than 1, the current moving direction of the focus lens 115 is a direction away from the on-focus position.

As shown in FIG. 6, it can be seen that for high frequency bands, the focus signal ratios have peak values near to the on-focus position, and for the lower the frequency bands, the peaks are away from the on-focus position.

In FIG. 6, it can be seen in an area A that the focus signal ratio of the image signal having the highest frequency band (25 to 30 lp/mm) is larger than the focus signal ratios of the other frequency bands. Also, it can be seen in an area B that the focus signal ratio of the image signal having the second-highest frequency band (12.5 to 17.5 lp/mm) is largest. In addition, it can be seen in an area C that the focus signal ratio of the image signal having the third-highest frequency band (7.5 to 12.5 lp/mm) is largest. Further, it can be seen in an area having minus amounts of defocus deviating from the area C that the focus signal ratio of the image signal having the lowest frequency band (2.5 to 7.5 lp/mm) is largest.

Further, in FIG. 6, it can be seen in an area a that the focus signal ratio of the image signal having the highest frequency band (25 to 30 lp/mm) is smaller than the focus signal ratios of the other frequency bands. Also, it can be seen in an area b that the focus signal ratio of the image signal having the second-highest frequency band (12.5 to 17.5 lp/mm) is smallest. In addition, it can be seen in an area c that the focus signal ratio of the image signal having the third-highest frequency band (7.5 to 12.5 lp/mm) is smallest. Further, it can be seen in an area having plus amounts of defocus deviating from the area c that the focus signal ratio of the image signal having the lowest frequency band (2.5 to 7.5 lp/mm) is smallest.

Using the above characteristics, the control unit 140 may calculate the amount of defocus of the current focus lens 115, based on the focus signal ratios for respective bands of the previous and current positions of the focus lens 115.

Specifically, when the focus signal ratio calculated by the control unit 140 is larger than or equal to 1, the control unit 140 selects a band having the largest focus signal ratio from the plurality of bands.

When the highest frequency band (25 to 30 lp/mm) of the plurality of bands has the largest focus signal ratio, the control unit 140 can know that the amount of defocus of the current focus lens 115 belongs to the range A. Therefore, the control unit 140 may set, as the amount of defocus of the current focus lens 115, −0.2 that is an intermediate value of the range A. In addition, since the focus signal ratio calculated by the control unit 140 is larger than or equal to 1, the control unit 140 may set the moving direction of the focus lens 115 to be same as the current moving direction.

In addition, when the second-highest frequency band (12.5 to 17.5 lp/mm) of the plurality of bands has the largest focus signal ratio, the control unit 140 can know that the amount of defocus of the current focus lens 115 belongs to the range B. Therefore, the control unit 140 may set, as the amount of defocus of the current focus lens 115, −0.6 that is an intermediate value of the range B. In addition, since the focus signal ratio calculated by the control unit 140 is larger than or equal to 1, the control unit 140 may set the moving direction of the focus lens 115 to be same as the current moving direction.

When the third-highest frequency band (7.5 to 12.5 lp/mm) of the plurality of bands has the largest focus signal ratio, the control unit 140 can know that the amount of defocus of the current focus lens 115 belongs to the range C. Therefore, the control unit 140 may set, as the amount of defocus of the current focus lens 115, −1 that is an intermediate value of the range C. In addition, since the focus signal ratio calculated by the control unit 140 is larger than or equal to 1, the control unit 140 may set the moving direction of the focus lens 115 to be same as the current moving direction.

Finally, when the lowest frequency band (2.5 to 7.5 lp/mm) of the plurality of bands has the largest focus signal ratio, the control unit 140 can know that the amount of defocus of the current focus lens 115 deviates from the range C. Therefore, the control unit 140 may set, as the amount of defocus of the current focus lens 115, −1.2 that is the smallest value of the range C. In addition, since the focus signal ratio calculated by the control unit 140 is larger than or equal to 1, the control unit 140 may set the moving direction of the focus lens 115 to be same as the current moving direction.

On the other hand, when the focus signal ratio calculated by the control unit 140 is smaller than 1, the control unit 140 may select a band having the smallest focus signal ratio from the plurality of bands.

When the highest frequency band (25 to 30 lp/mm) of the plurality of bands has the smallest focus signal ratio, the control unit 140 can know that the amount of defocus of the current focus lens 115 belongs to the range a. Therefore, the control unit 140 may set, as the amount of defocus of the current focus lens 115, 0.4 that is an intermediate value of the range a. In addition, since the focus signal ratio calculated by the control unit 140 is smaller than 1, the control unit 140 may set the moving direction of the focus lens 115 to be opposite to the current moving direction.

In addition, when the second-highest frequency band (12.5 to 17.5 lp/mm) of the plurality of bands has the smallest focus signal ratio, the control unit 140 can know that the amount of defocus of the current focus lens 115 belongs to the range b. Therefore, the control unit 140 may set, as the amount of defocus of the current focus lens 115, 0.8 that is an intermediate value of the range b. In addition, since the focus signal ratio calculated by the control unit 140 is smaller than 1, the control unit 140 may set the moving direction of the focus lens 115 to be opposite to the current moving direction.

When the third-highest frequency band (7.5 to 12.5 lp/mm) of the plurality of bands has the smallest focus signal ratio, the control unit 140 can know that the amount of defocus of the current focus lens 115 belongs to the range c. Therefore, the control unit 140 may set, as the amount of defocus of the current focus lens 115, 1.4 that is an intermediate value of the range c. In addition, since the focus signal ratio calculated by the control unit 140 is smaller than 1, the control unit 140 may set the moving direction of the focus lens 115 to be opposite to the current moving direction.

Finally, when the lowest frequency band (2.5 to 7.5 lp/mm) of the plurality of bands has the smallest focus signal ratio, the control unit 140 can know that the amount of defocus of the current focus lens 115 deviates from the range c. Therefore, the control unit 140 may set, as the amount of defocus of the current focus lens 115, 1.7 that is the largest value of the range c. In addition, since the focus signal ratio calculated by the control unit 140 is smaller than 1, the control unit 140 may set the moving direction of the focus lens 115 to be opposite to the current moving direction.

By the above principle, the control unit 140 can calculate the amount of defocus by using the focus signal ratios. In the above descriptions, the intermediate values of the ranges A, B and C and the ranges a, b and c are set as the amounts of defocus. However, it should be noted that this is just an example. For example, the control unit 140 may set, as the amount of defocus, any value of the ranges A, B and C and the ranges a, b and c.

Thus, the control unit 140 may calculate the amount of defocus of the focus lens 115 and then control the driving unit 150 so that the focus lens 115 is moved depending on the amount of defocus. To be more specific, the control unit 140 may control the driving unit 150 so that the larger the calculated amount of defocus, the higher the moving speed of the focus lens 115. In addition, the control unit 140 may control the driving unit so that the focus lens 115 is moved to a position near to the on-focus position based on the calculation, or is moved to a position near to the on-focus position after calculating the amount of defocus a second time during the travel.

Additionally, when it is determined that the focus lens 115 is moved to a position near to the on-focus position, the control unit 140 may calculate a correct on-focus position by three-point interpolation. Specifically, the control unit 140 may calculate focus signal values for three positions near to the on-focus position and determines, as an on-focus position, a position at which a tangent line of one position intersects with a connection line of two points. This process will be specifically described with reference to FIG. 8, below.

The driving unit 150 may drive the focus lens 115 under control of the control unit 140. By the above configuration, the camera 100 may calculate the amounts of defocus by using the focus signals for the plurality of bands and moves the position of the focus lens 115 depending on the amounts of defocus, thereby performing the auto focusing function. When the amount of defocus is large, the camera 100 may enable the focus lens 115 to be moved fast, so that it is possible to obtain a focus in a short time.

Hereinafter, an example of an auto focusing method will be specifically described with reference to FIG. 3. FIG. 3 is a flow chart showing an auto focusing method according to an embodiment of the invention.

First, the camera 100 detects incident light of a subject through the lens unit 110 and generates an image signal about a subject image (S310). Then, the camera 100 extracts a partial area of the generated image signal (S320). Here, the partial area of the captured image signal indicates a part that is used for focus detection. The camera is adapted to focus a partial area of a captured image, for example, a partial area of a central part of a screen. However, the invention is not limited thereto. For example, the camera may be adapted to detect a focus for various parts of a captured image signal. Thus, the camera 100 may focus the partial area extracted by the image processing unit 210, thereby reducing calculations for performing an auto focusing function and increasing focusing speed.

After that, the camera 100 separates the image signal into a plurality of different bands by using the plurality of band pass filters (S330).

Then, the camera 100 receives image signals of the bands having passed through the band pass filters, respectively, and calculates focus signal values for the image signals of the respective bands (S340). In other words, the camera 100 calculates one focus signal value for an image signal of a band having passed through one of the band pass filters. Accordingly, the number of the focus signal values calculated by the camera 100 is the same as the number of the band pass filters.

Here, the focus signal value is a contrast value in accordance with the contrast auto focusing method.

Then, the camera 100 calculates amounts of defocus of the focus lens 115, based on first focus signal values, which are focus signal values at a first position of the focus lens 115, and second focus signal values, which are focus signal values at a second position of the focus lens 115, and moves a position of the focus lens 115 depending on the calculated amounts of defocus. Here, the amount of defocus is a value indicating a degree of deviation of the focus lens 115 from an oh-focus position (i.e., in focus position).

To this end, the camera 100 calculates ratios of the first focus signal values, which are a plurality of focus signal values at the first position of the focus lens 115, and the second focus signal values, which are a plurality of focus signal values at the second position of the focus lens 115 (S350).

Specifically, the camera 100 calculates first focus signal values while the focus lens 115 is at the first position. Then, the camera 100 moves the focus lens 115 to the second position. The camera 100 calculates second focus signal values while the focus lens 115 is at the second position. At this time, the first position is a previous position of the focus lens 115 and the second position is a current position of the focus lens 115.

After that, the camera 100 calculates a focus signal ratio (second focus signal value/first focus signal value) that is a ratio of the second focus signal value to the first focus signal value for each of the bands. In other words, one focus signal ratio per each band is calculated. For example, when five band pass filters 221 to 225 are included as shown in FIG. 2, the number of bands is five, so that the camera 100 calculates five focus signal ratios. Like this, the camera 100 calculates the focus signal ration values for the respective bands with respect to two positions of the focus lens 115.

For example, it is assumed as follows: while the focus lens 115 is at the first position, the focus signal value calculating unit 230 generates a focus signal value a1 for an image signal having passed through BPF1 221, a focus signal value b1 for an image signal having passed through BPF2 222, a focus signal value c1 for an image signal having passed through BPF3 223, a focus signal value d1 for an image signal having passed through BPF4 224 and a focus signal value e1 for an image signal having passed through BPF5 225, and then while the focus lens 115 is at the second position, the focus signal value calculating unit 230 generates a focus signal value a2 for an image signal having passed through BPF1 221, a focus signal value b2 for an image signal having passed through BPF2 222, a focus signal value c2 for an image signal having passed through BPF3 223, a focus signal value d2 for an image signal having passed through BPF4 224 and a focus signal value e2 for an image signal having passed through BPF5 225. Then, the control unit 140 calculates a2/a1, b2/b1, c2/c1, d2/d1 and e2/e1, as focus signal ratios for respective bands.

Then, the camera 100 determines whether the focus signal ratios are larger than or equal to 1 or smaller than 1 (S360). In this case, accuracy is high when it is determined whether the focus signal ratio of a low frequency band is larger than or equal to 1 or smaller than 1. This is because a focus signal of a low frequency band has a gentle peak and less noise.

When the focus signal ratios for the plurality of bands are larger than or equal to 1 (Yes in S360), the camera 100 calculates an amount of defocus corresponding to a band having the largest focus signal ratio of the focus signal ratios (S370).

When the focus signal ratios are larger than or equal to 1 (Yes in S360), it indicates that a moving direction of the focus lens 115 from the first position to the second position is a direction approaching the on-focus position. Accordingly, when the focus signal ratios are larger than or equal to 1 (Yes in S360), the camera 100 drives so that the focus lens 115 moves in the current moving direction (moving direction from the first position to the second position) at a moving speed corresponding to the amount of defocus (S375).

On the other hand, when the focus signal ratios are smaller than 1 (No in S360), the camera 100 calculates an amount of defocus corresponding to a band having the smallest focus signal ratio of the focus signal ratios (S380).

When the focus signal ratios are smaller than 1 (No in S360), the focus lens 115 moves in a direction opposite to the current moving direction (moving direction from the first position to the second position) at a moving speed corresponding to the amount of defocus (S385).

Thus, the camera 100 determines the driving direction of the focus lens depending on whether the focus signal ratios for the plurality of bands are larger than or equal to 1 or smaller than 1.

The method of calculating the amount of defocus by the camera 100 has already been described with reference to FIG. 6.

Thus, after moving the focus lens 115, the camera 100 determines whether the focus lens 115 is near to the on-focus position (S390). Specifically, when the focus signal ratio is larger than 1 at the previous position and then smaller than 1 at the current position or when the focus signal ratio is smaller than 1 at the previous position and then larger than 1 at the current position, the camera 100 may determine that the focus lens is near to the on-focus position. In addition, when the focus signal value is increased and then decreased or when the focus signal value is decreased and then increased, the camera 100 may determine that the focus lens is near to the on-focus position.

When the focus lens is not near to the on-focus position (No in S390), the camera 100 again performs the process from S310. On the other hand, when the focus lens is near to the on-focus position (Yes in S390), the camera 100 detects the on-focus position by using the three-point interpolation and moves the focus lens 115 to the detected on-focus position.

Through the above process, the camera 100 may calculate the amount of defocus by using the focus signals for the plurality of bands and move the focus lens 115 depending on the amounts of focus, thereby performing the auto focusing function. When the amount of defocus is large, the camera 100 may move the focus lens 115 fast, so that it is possible to obtain focus in a short time.

Figure 4A:
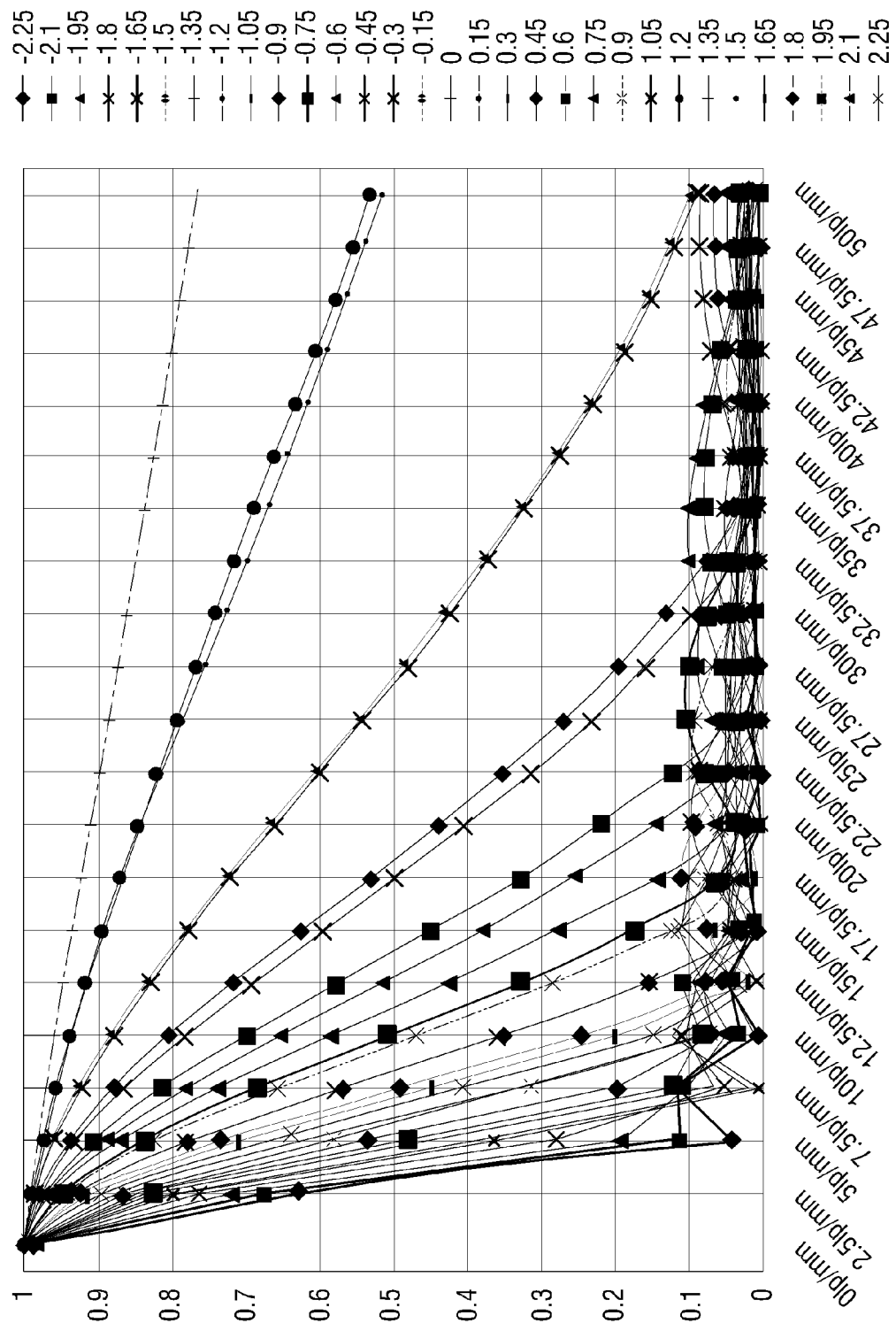
FIGS. 4A and 4B are graphs showing focus signal values depending on focus lens positions and frequencies according to an exemplary embodiment of the invention.
Figure 4B:
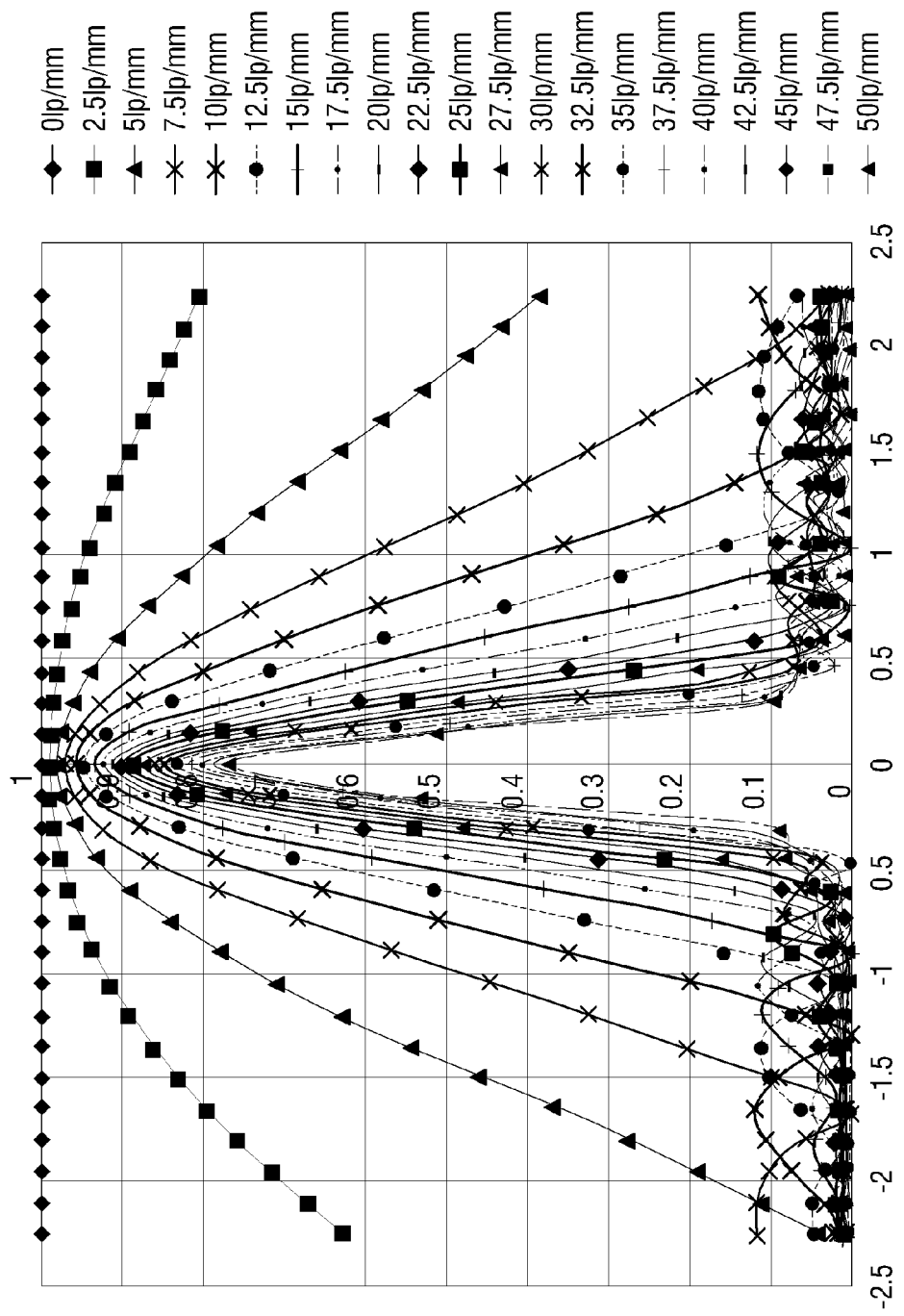

Hereinafter, referring to FIGS. 4A to 7, the characteristics of the focus signal will be described using graphs. FIGS. 4A and 4B are graphs showing focus signal values depending on focus lens positions and frequencies according to an exemplary embodiment.

FIG. 4A is a graph showing focus signal values for various frequencies. In FIG. 4A, an x axis indicates frequency values of an image signal and a y axis indicates focus signal values (i.e., contrast values). The lines on the graph indicate amounts of defocus of the focus lens 115. When an amount of defocus is zero, it corresponds to an on-focus position. When the amount of defocus is larger or smaller than zero, it indicates that a position is more distant from the on-focus position.

As shown in FIG. 4A, it can be seen that the nearer to the on-focus position, a variation of the focus signal value depending on frequencies is gentle, and the more distant from the on-focus position, the focus signal value rapidly decreases as the frequency is increased. In other words, it can be seen that the more distant from the on-focus position, the contrast of high frequency is rapidly decreased.

FIG. 4B is a graph showing focus signal values for amounts of defocus. In FIG. 4B, an x axis indicates amounts of defocus of the focus lens 115 and a y axis indicates focus signal values (i.e., contrast values). The lines on the graph indicate frequencies of an image signal.

As shown in FIG. 4B, it can be seen that most of the focus signal values are near to 1 at the on-focus position but the larger the amount of defocus, the focus signal value is decreased. In particular, it can be seen that the higher the frequency, the focus signal value is rapidly decreased.

As can be seen from FIGS. 4A and 4B, the larger the amount of defocus, the focus signal value is decreased, and a degree of the decrease is different depending on the frequencies.

FIGS. 5A to 5D are graphs showing focus signal values and focus signal ratios depending on focus lens positions and frequency bands according to an exemplary embodiment of the invention.

Figure 5A:
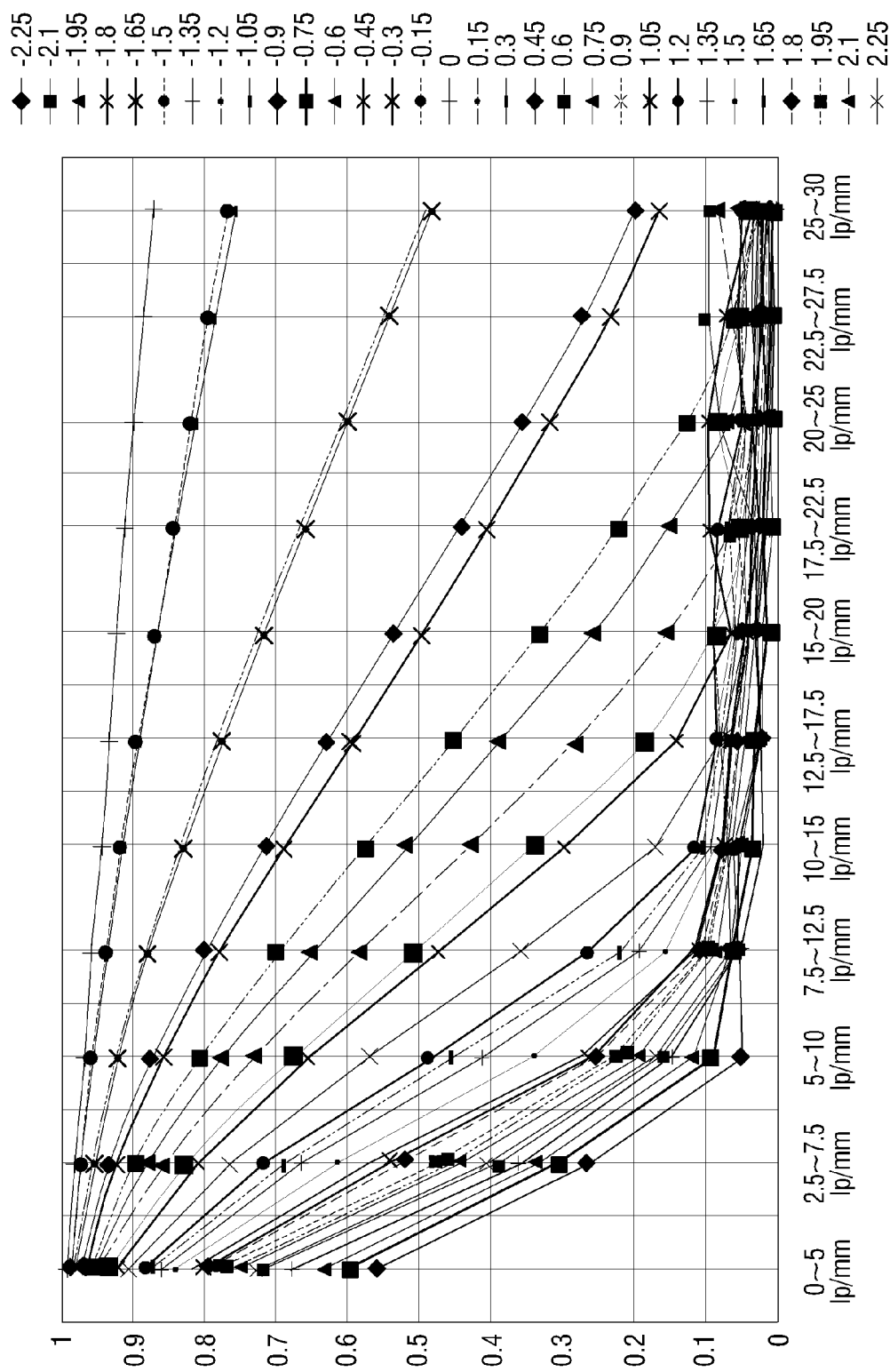
FIGS. 5A to 5D are graphs showing focus signal values and focus signal ratios depending on focus lens positions and frequencies according to an exemplary embodiment of the invention.
Figure 5B:
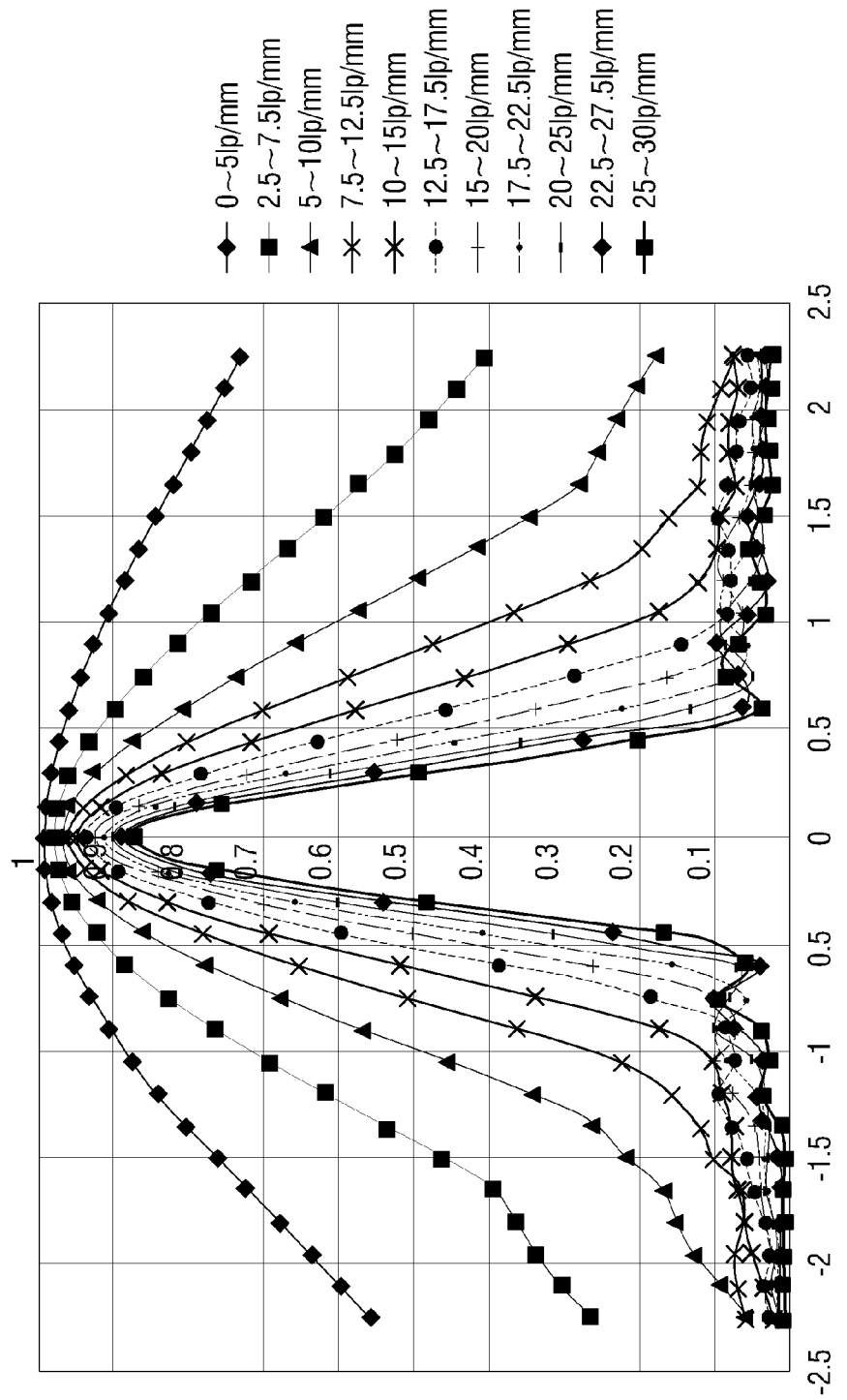
Figure 5C:
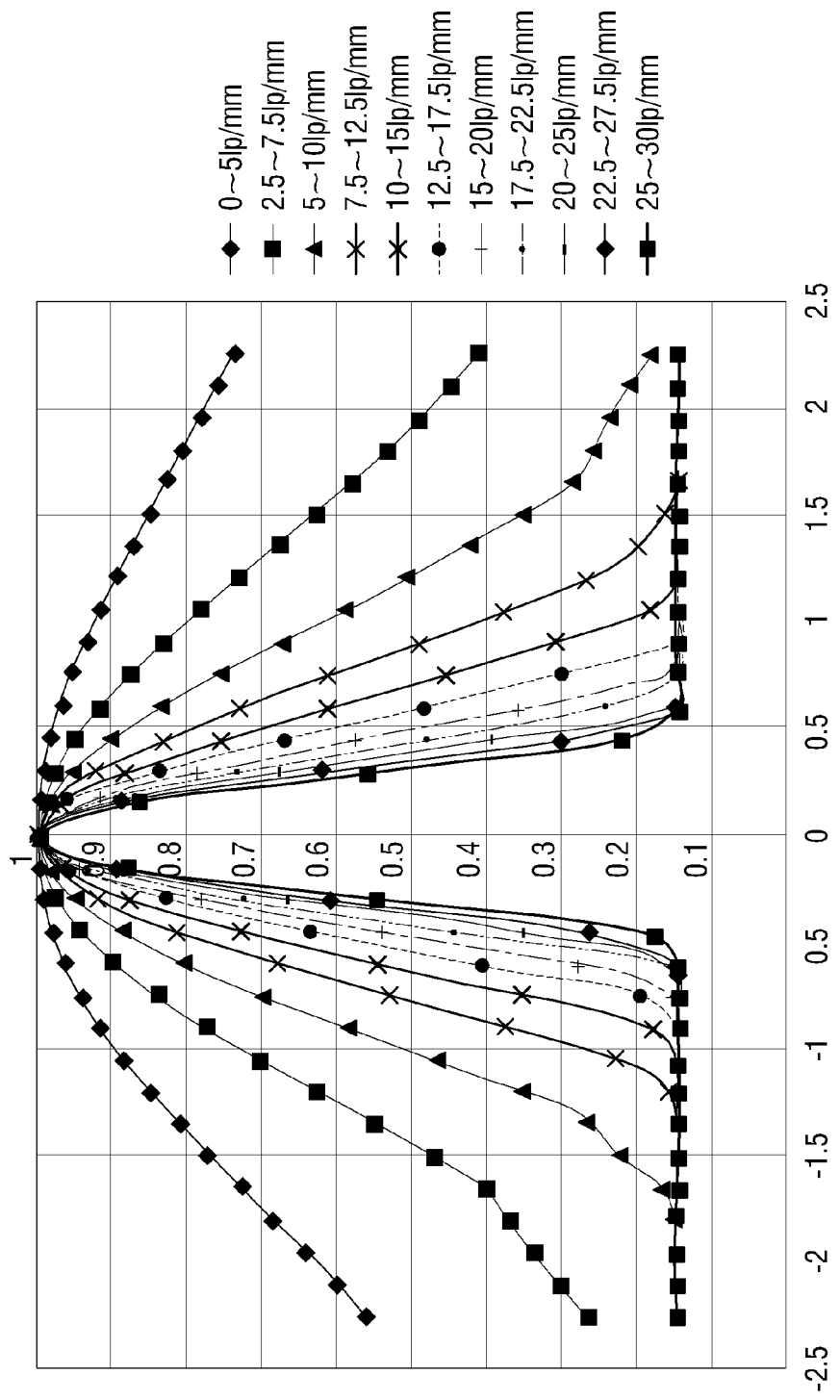

Although FIGS. 5A and 5B are similar to FIGS. 4A and 4B, FIGS. 4A and 4B are graphs relating to frequency values and FIGS. 5A and 5B are graphs relating to frequency bands. Accordingly, it can be seen that the focus signal has the characteristics of frequency bands, which are similar to the characteristics of the frequency values. FIG. 5C is a graph showing results obtained by normalizing the graphs of FIGS. 5A and 5B.

Figure 5D:
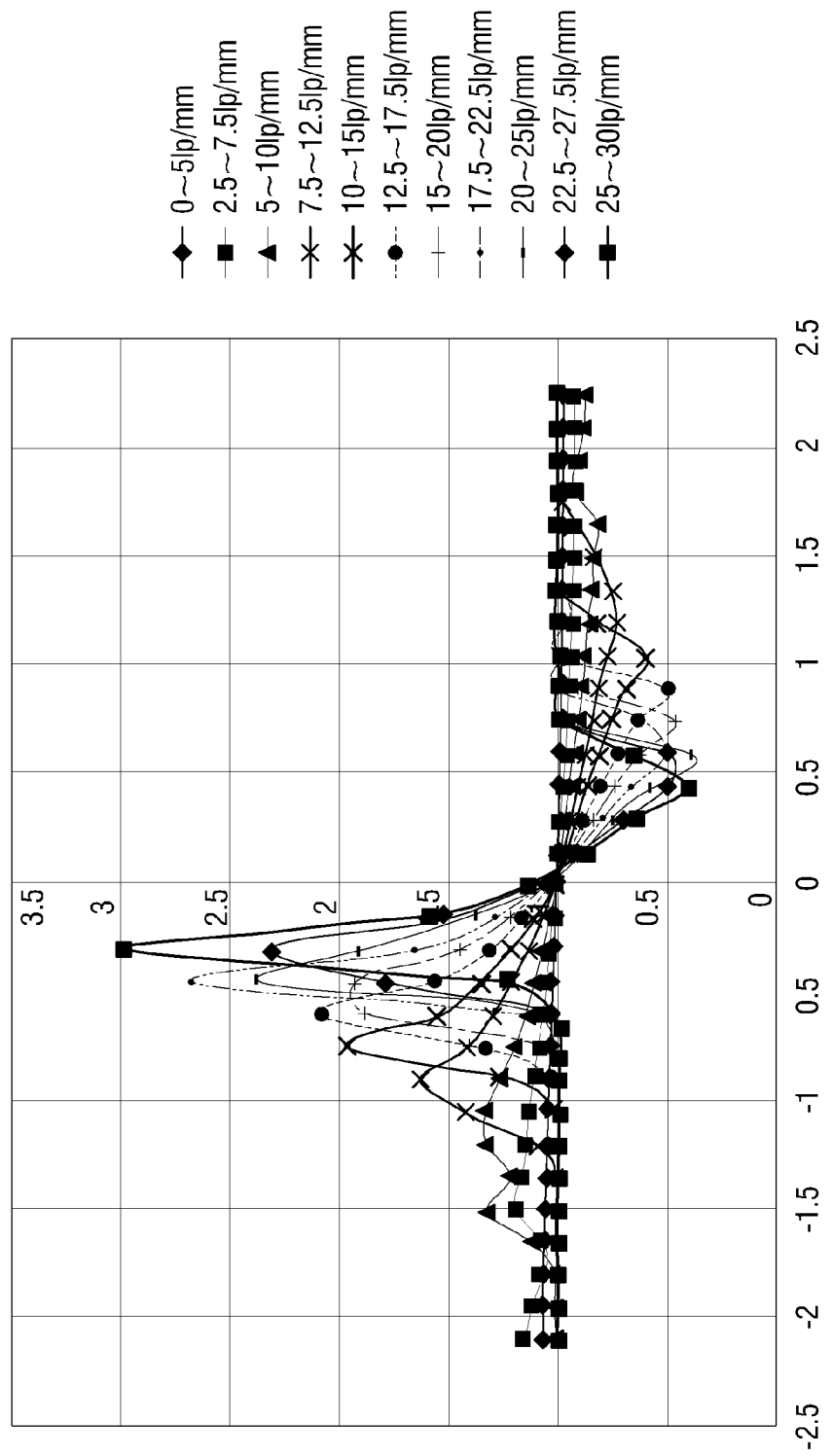

FIG. 5D is a graph showing focus signal ratios for amounts of defocus. In FIG. 5D, an x axis indicates amounts of defocus, a y axis indicates focus signal ratios and, each line indicates a frequency band. Here, a position at which the amount of defocus is zero indicates the on-focus position.

As shown in FIG. 5D, it can be seen that the focus signal ratios are larger than 1 in the left (area in which the amounts of defocus are minus) of the on-focus position (at which the amount of defocus is zero) and the focus signal ratios are smaller than 1 in the right (area in which the amounts of defocus are plus). That is, when the amount of defocus is negative, the focus signal value is increased up to a peak as the amount of defocus is increased, and when the amount of defocus is positive, the focus signal value is decreased down to a peak as the amount of defocus is increased. In addition, it can be seen that when the focus signal ratio is larger than 1, the current moving direction of the focus lens 115 is a direction approaching the on-focus position. On the other hand, it can be seen that when the focus signal ratio is smaller than 1, the current moving direction of the focus lens 115 is a direction getting away from the on-focus position.

As shown in FIG. 5D, it can be seen that for high frequency bands, the focus signal ratio has a peak focus signal ratio near to the on-focus position, and for the lower the frequency bands, the peak moves away from the on-focus position.

By using the above characteristics, the camera 100 can calculate the amounts of defocus, based on the focus signal ratios of the current position of the focus lens 115.

FIG. 6 is a graph showing focus signal ratios depending on focus lens positions for four frequency bands according to one embodiment of the invention. As shown in FIG. 6, it can be seen that when four frequency bands are selected, it is possible to perceive the characteristics of the focus signal ratios more easily. Since FIG. 6 has been already described, its detailed description is omitted.

Figure 7:
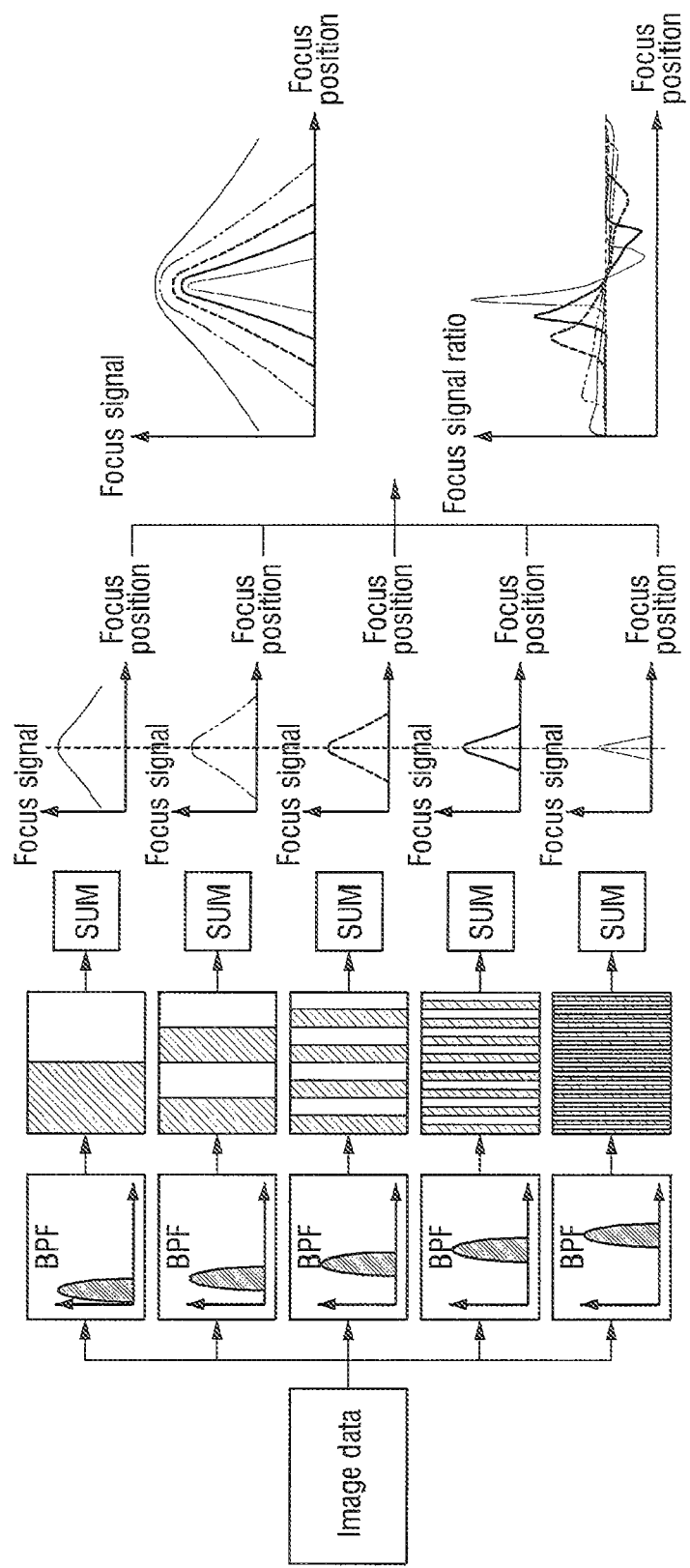
FIG. 7 shows an example of focus signals that are output from five band pass filters according to an exemplary embodiment of the invention.

FIG. 7 shows an example of focus signals that are output from five band pass filters (BPFs) according to one embodiment of the invention. As shown in FIG. 7, the band pass filters enable the signals having different frequency bands to pass therethrough. It can be seen that the focus signals exhibit different characteristics depending on the frequency bands and the frequency band in which the focus signal ratio is largest or smallest is different depending on the amounts of defocus (i.e., focus positions).

By using the characteristics of the focus signal ratios, the camera 100 calculates the amounts of defocus and moves the position of the focus lens 115 depending on the amounts of defocus, thereby performing the auto focusing function.

Figure 8:
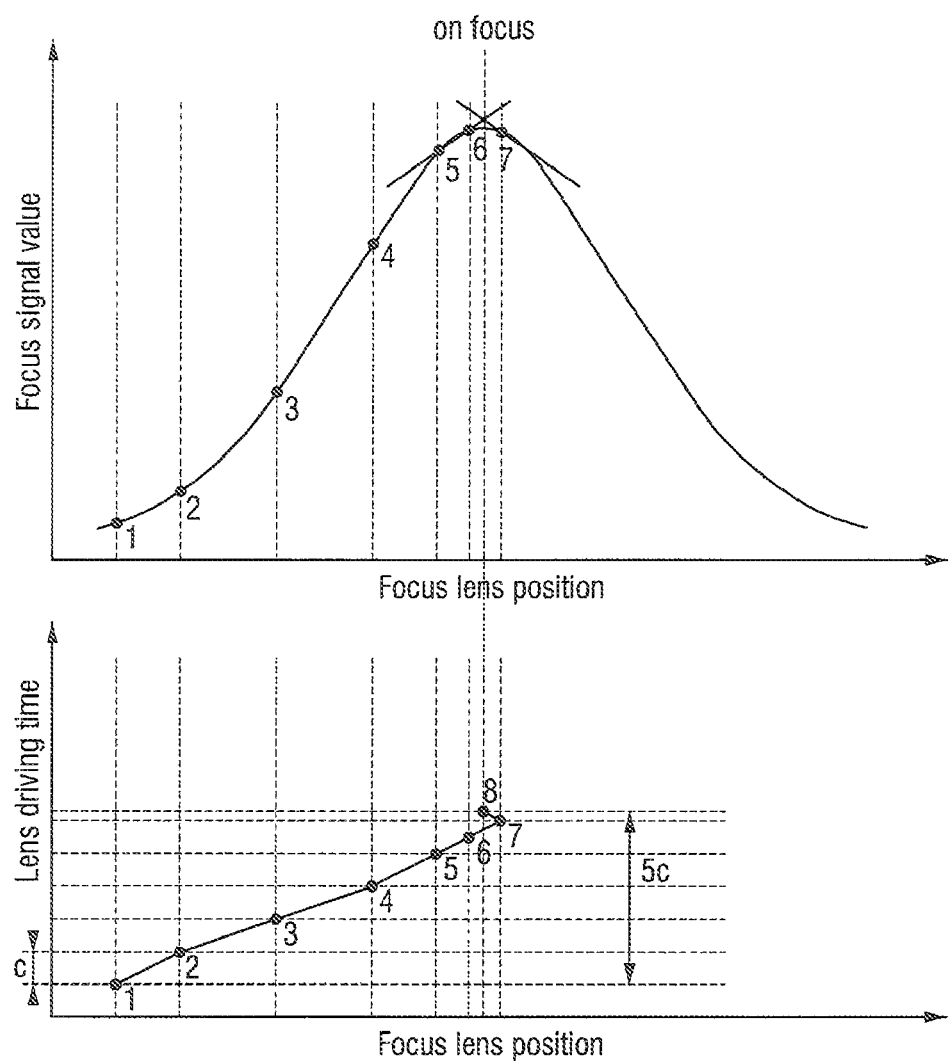
FIG. 8 illustrates a process of detecting an on-focus position through defocus amount calculations of two times according to an exemplary embodiment of the invention.

Hereinafter, a process of moving the focus lens 115 to the on-focus position will be described with reference to FIGS. 8 to 12. FIG. 8 illustrates a process of detecting an on-focus position through two defocus amount calculations according to one embodiment of the invention.

In FIG. 8, the upper view shows a graph relating to focus signal values depending on focus lens positions (i.e., amounts of defocus). The lower view of FIG. 8 shows a graph relating to lens driving time depending on focus lens positions. As shown in FIG. 8, it can be seen that the camera 100 calculates a focus signal value every time interval c.

In FIG. 8, an initial position of the focus lens 115 is labeled No. 1. While the focus lens 115 is at position No. 1, the camera 100 may calculate a first focus signal value and then move the focus lens 115 to position No. 2. While the focus lens 115 is at position No. 2, the camera 100 may calculate a second focus signal value. At this time, the upper graph of FIG. 8 is depicted for only one frequency band to simplify explanation. Actually, the camera 100 of this embodiment may calculate focus signal values for a plurality of frequency bands, as described above.

Then, the camera 100 may calculate a focus signal ratio (second focus signal value/first focus signal value) that is a ratio of the second focus signal value to the first focus signal value while the focus lens 115 is at position No. 2. Then, the camera may calculate an amount of defocus at position No. 2 of the focus lens 115 by using the calculated focus signal ratio.

Then, the camera may increase the moving speed depending on the calculated amount of defocus to move the focus lens 115 to position No. 3 toward the on-focus position. While moving to position No. 4 via position No. 3, the camera 100 may calculate focus signal ratios and amounts of defocus. Then, the camera 100 may move the focus lens 115 to position No. 5, taking into consideration the amounts of defocus.

When the focus lens 115 reaches position No. 5, the camera 100 may detect that the position is near to the on-focus position and may perform a three-point interpolation. Specifically, the camera 100 may calculate the focus signal values at position Nos. 5, 6 and 7, respectively, and then calculate a point at which a line connecting focus signal values at positions Nos. 5 and 6 intersects with a tangent line of the focus signal value at position No. 7, as shown in the upper graph of FIG. 8.

Then, the camera 100 may determine, as an on-focus position, position No. 8 at which the two lines intersect with each other, and finally move the focus lens 115 to position No. 8.

Through the above process, the camera 100 may perform the auto focusing. In addition, as shown in FIG. 8, it can be seen that the time necessary for focusing is approximately a time interval of 5c. In particular, it can be seen that the speed at which the focus lens 115 is moved from position No. 2 to position No. 3 is higher than the speed at which the focus lens is moved from position No. 1 to position No. 2.

Thus, since the camera 100 may control the moving speed of the focus lens 115 depending on the amounts of defocus, it is possible to obtain a focus in a shorter time than a case wherein the focus lens 115 is moved at constant speed.

Figure 9:
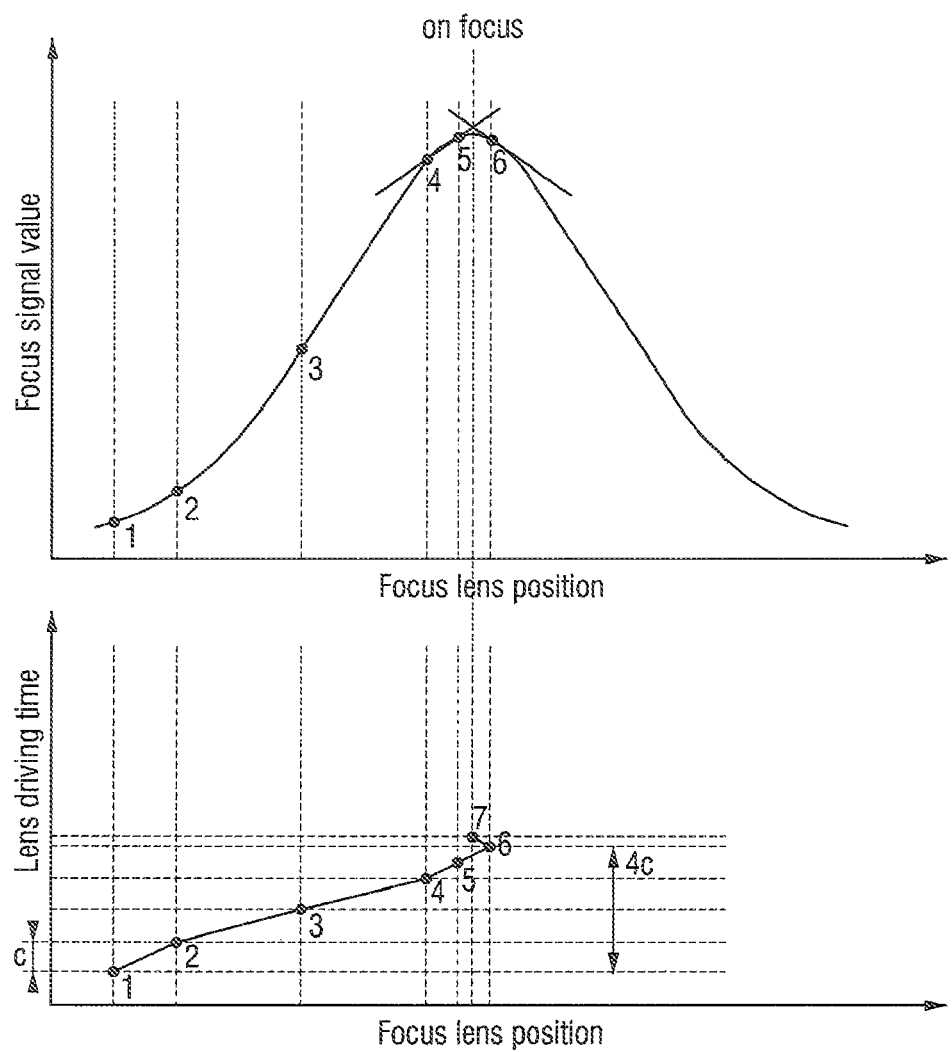
FIG. 9 illustrates a process of detecting an on-focus position through a defocus amount calculation of one time and performing a three-point interpolation with a driving interval of 3Fδ according to an exemplary embodiment of the invention.

FIG. 9 illustrates a process of detecting an on-focus position through a defocus amount calculation of one time and performing a three-point interpolation with a driving time interval of HS according to one embodiment of the invention. Here, since the time interval c corresponds to the driving interval of 6Fδ, the driving interval of 3Fδ corresponds to a time interval of c/2.

The upper view of FIG. 9 is a graph relating to focus signal values depending on focus lens positions (i.e., amounts of defocus). The lower view of FIG. 9 is a graph relating to lens driving time depending on focus lens positions. As shown in FIG. 9, it can be seen that the camera 100 calculates a focus signal value every time interval c.

In FIG. 9, an initial position of the focus lens 115 is position No. 1. While the focus lens 115 is at position No. 1, the camera 100 may calculate a first focus signal value and then move the focus lens 115 to position No. 2. While the focus lens 115 is at position No. 2, the camera 100 may calculate a second focus signal value. At this time, the upper graph of FIG. 9 is depicted for only one frequency band to simplify explanation. Actually, the camera 100 of this embodiment may calculate focus signal values for a plurality of frequency bands, as described above.

Then, the camera 100 may calculate a focus signal ratio (second focus signal value/first focus signal value) that is a ratio of the second focus signal value to the first focus signal value under state in which the focus lens 115 is at position No. 2. Then, the camera may calculate an amount of defocus at position No. 2 of the focus lens 115 by using the calculated focus signal ratio.

Then, the camera may increase the moving speed depending on the calculated amount of defocus to move the focus lens 115 to position No. 3 toward the on-focus position. Then, the camera 100 may move the focus lens to position No. 4 via position No. 3.

When the focus lens 115 reaches position No. 4, the camera 100 may detect that the position is near to the on-focus position and perform a three-point interpolation. Specifically, the camera 100 may calculate the focus signal values at position Nos. 4, 5 and 6, respectively, and then calculate a point at which a line connecting focus signal values at position Nos. 4 and 5 intersects with a tangent line of the focus signal value at position No. 6, as shown in the upper graph of FIG. 9. At this time, it can be seen that the time interval for performing the three-point interpolation is c/2 (i.e., 3Fδ).

Then, the camera 100 may determine, as an on-focus position, position No. 7 at which the two lines intersect with each other, and finally move the focus lens 115 to position No. 7.

Through the above process, the camera 100 performs auto focusing. In addition, as shown in FIG. 9, it can be seen that the time necessary for focusing is approximately a time interval of 4c. In particular, it can be seen that the speed at which the focus lens 115 is moved from position No. 2 to position No. 3 is higher than the speed at which the focus lens is moved from position No. 1 to position No. 2.

Thus, since the camera 100 may control the moving speed of the focus lens 115 depending on the amounts of defocus, it is possible to detect a focus in a shorter time than a case wherein the focus lens 115 is moved at constant speed.

Figure 10:
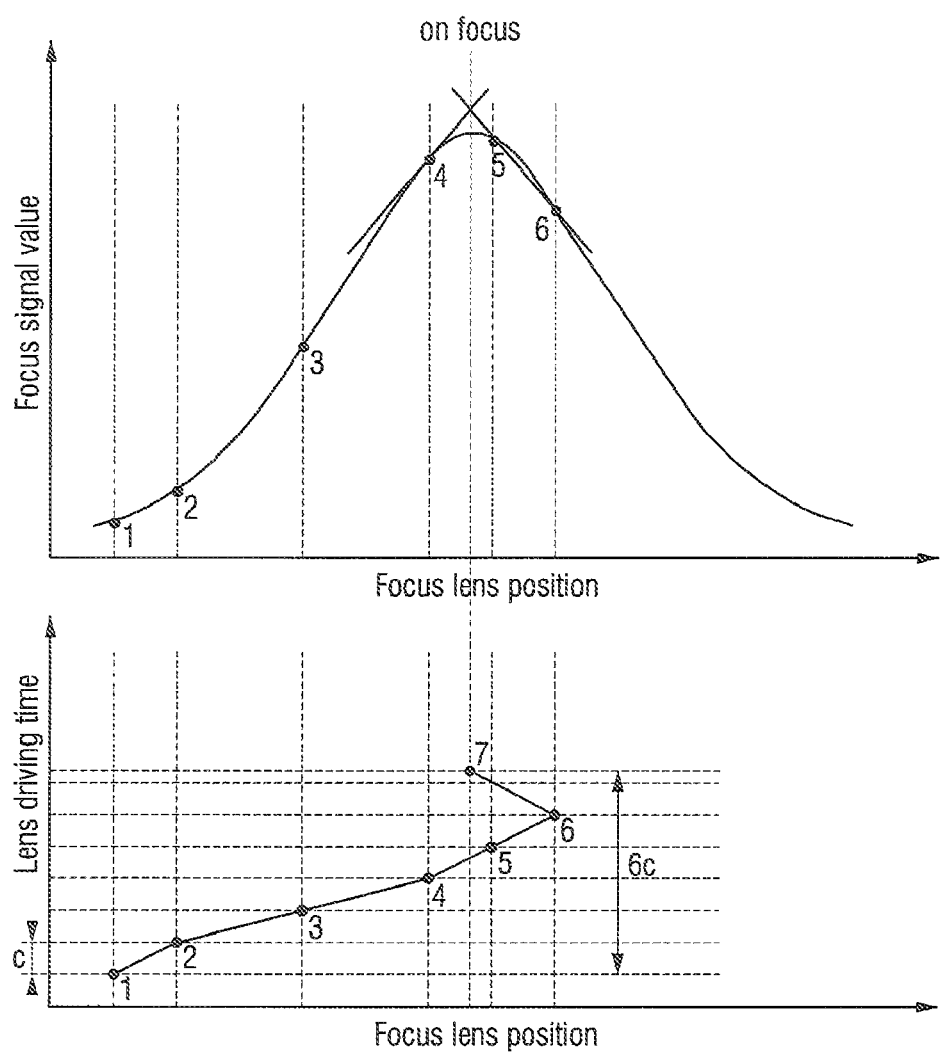
FIG. 10 illustrates a process of detecting an on-focus position through a defocus amount calculation of one time and performing a three-point interpolation with a driving interval of 6Fδ according to an exemplary embodiment of the invention.

FIG. 10 illustrates a process of detecting an on-focus position through a defocus amount calculation of one time and performing a three-point interpolation with a driving interval of 6Fδ according to one embodiment of the invention. Here, the time interval c corresponds to the driving interval of 6Fδ.

The upper view of FIG. 10 is a graph relating to focus signal values depending on focus lens positions (i.e., amounts of defocus). The lower view of FIG. 10 is a graph relating to lens driving time depending on focus lens positions. As shown in FIG. 10, it can be seen that the camera 100 may calculate a focus signal value every time interval c.

In FIG. 10, an initial position of the focus lens 115 is position No. 1. While the focus lens 115 is at position No. 1, the camera 100 may calculate a first focus signal value and then move the focus lens 115 to position No. 2. While the focus lens 115 is at position No. 2, the camera 100 may calculate a second focus signal value. At this time, the upper graph of FIG. 10 is depicted for only one frequency band to simplify explanation. Actually, the camera 100 of this embodiment may calculate focus signal values for a plurality of frequency bands, as described above.

Then, the camera 100 may calculate a focus signal ratio (second focus signal value/first focus signal value) that is a ratio of the second focus signal value to the first focus signal value under state in which the focus lens 115 is at position No. 2. Then, the camera may calculate an amount of defocus at position No. 2 of the focus lens 115 by using the calculated focus signal ratio.

Then, the camera may increase the moving speed depending on the calculated amount of defocus to move the focus lens 115 to position No. 3 toward the on-focus position. Then, the camera 100 may move the focus lens to position No. 4 via position No. 3.

When the focus lens 115 reaches position No. 4, the camera 100 may detect that the position is near to the on-focus position and perform a three-point interpolation. Specifically, the camera 100 may calculate the focus signal values at position Nos. 4, 5 and 6, respectively, and then calculate a point at which a tangent line of the focus signal value of position No. 4 intersects with a line connecting focus signal values at position Nos. 5 and 6, as shown in the upper graph of FIG. 10. At this time, it can be seen that the time interval for performing the three-point interpolation is c (i.e., 6Fδ).

Then, the camera 100 may determine, as an on-focus position, position No. 7 at which the two lines intersect with each other, and finally move the focus lens 115 to position No. 7. Through the above process, the camera 100 performs auto focusing. In addition, as shown in FIG. 10, it can be seen that the time necessary for focusing is approximately a time interval of 6c. In particular, it can be seen that the speed at which the focus lens 115 is moved from position No. 2 to position No. 3 is higher than the speed at which the focus lens is moved from position No. 1 to position No. 2.

Thus, since the camera 100 may control the moving speed of the focus lens 115 depending on the amount of defocus, it is possible to detect a focus in a shorter time than a case wherein the focus lens 115 is moved at constant speed.

Figure 11:
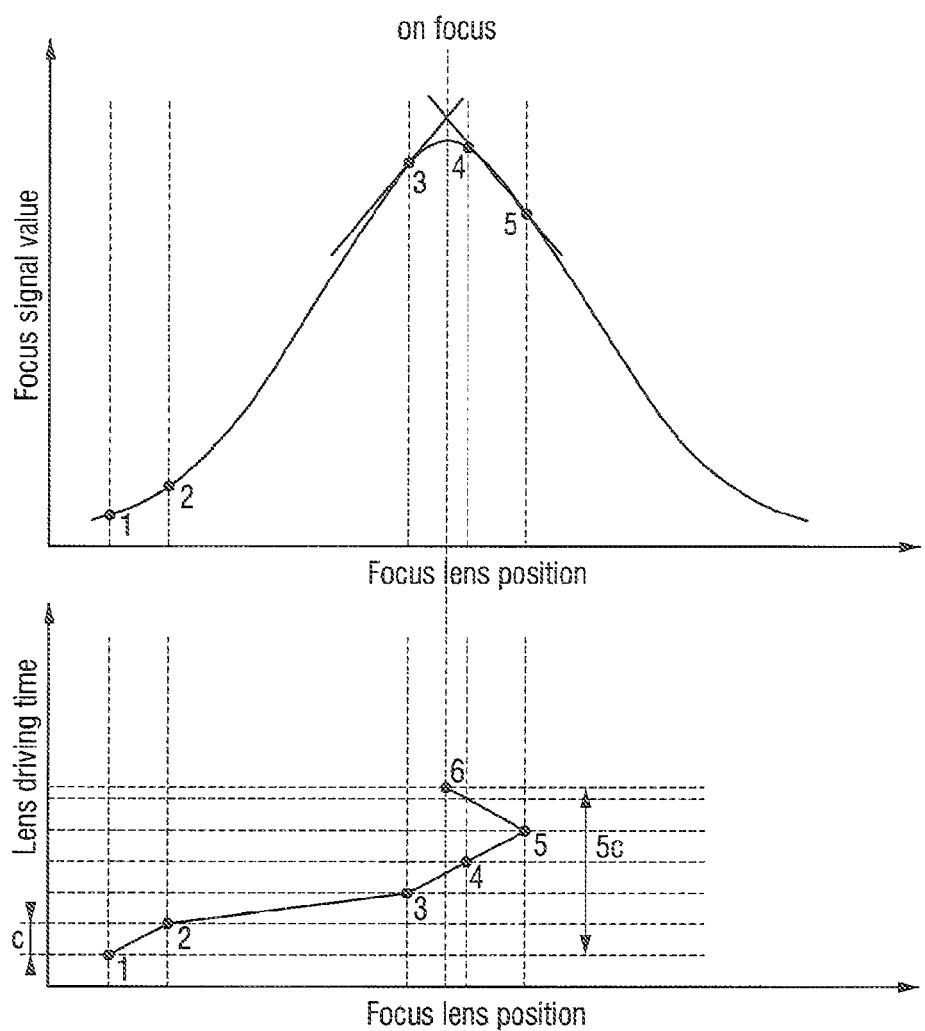
FIG. 11 illustrates a process of directly moving to a position adjacent to an on-focus position through a defocus amount calculation of one time and performing a three-point interpolation according to an exemplary embodiment of the invention.

FIG. 11 illustrates a process of directly moving to a position adjacent to an on-focus position through a defocus amount calculation of one time and performing a three-point interpolation according to one embodiment of the invention.

Contrary to FIG. 10, it can be seen in FIG. 11 that the position of the focus lens 115 is directly moved from position No. 2 to position No. 3 that is near to the on-focus position. Also, it can be seen that the camera 100 performs a three-point interpolation by using position Nos. 3, 4 and 5.

In FIG. 11, it can be seen that the time necessary for focusing is 5c, which is shorter than the case in FIG. 10 by the time c.

Thus, the camera 100 may calculate the amounts of defocus by using the focus signal ratios of two positions and move the focus lens 115 to a position adjacent to the on-focus position with the calculated amounts of defocus. Thus, it is possible to perform the auto focusing function faster.

Figure 12:
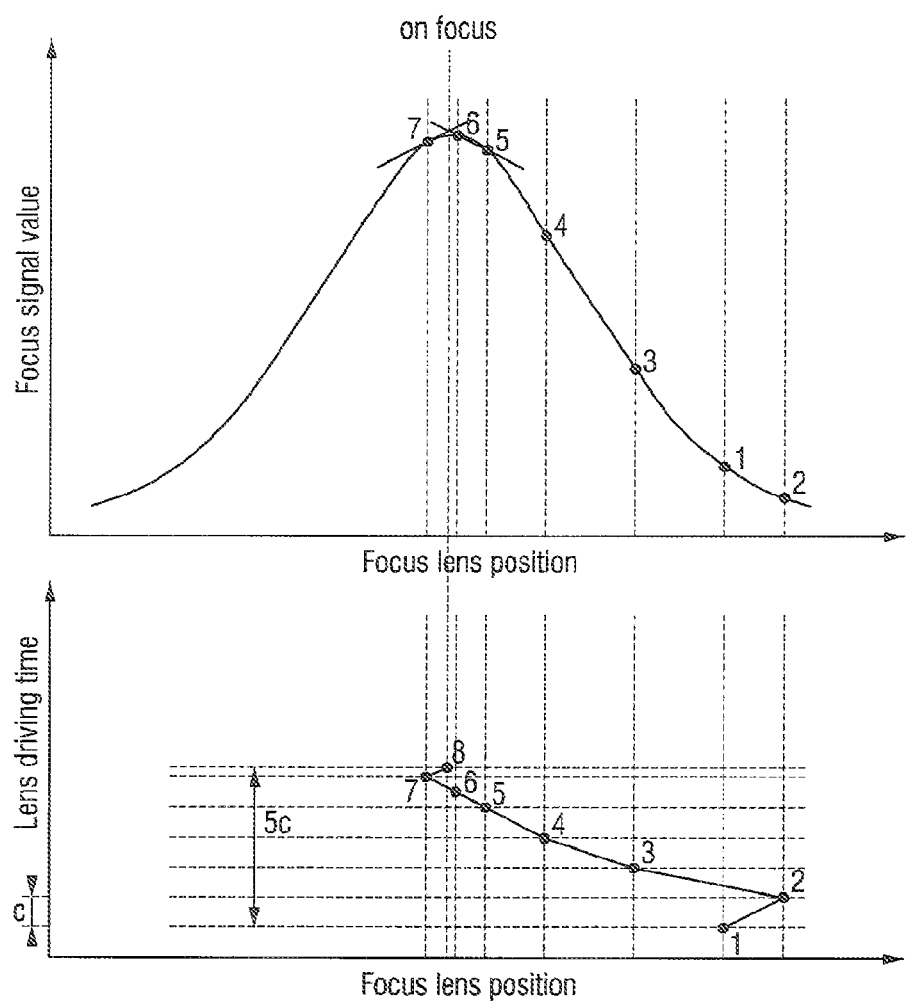
FIG. 12 illustrates an auto focusing process when an initial position is a position beyond an on-focus position according to an exemplary embodiment of the invention.

FIG. 12 illustrates an auto focusing process when an initial position is beyond an on-focus position according to one embodiment of the invention.

The upper view of FIG. 12 is a graph relating to, focus signal values depending on focus lens positions (i.e., amounts of defocus). The lower view of FIG. 12 is a graph relating to lens driving time depending on focus lens positions. As shown in FIG. 12, it can be seen that the camera 100 may calculate a focus signal value every time interval c.

In FIG. 12, an initial position of the focus lens 115 is position No. 1. While the focus lens 115 is at position No. 1, the camera 100 may calculate a first focus signal value and then move the focus lens 115 to position No. 2. While the focus lens 115 is at position No. 2, the camera 100 may calculate a second focus signal value. At this time, the upper graph of FIG. 12 is depicted for only one frequency band to simplify explanation. Actually, the camera 100 of this embodiment may calculate focus signal values for a plurality of frequency bands, as described above.

Then, the camera 100 may calculate a focus signal ratio (second focus signal value/first focus signal value) that is a ratio of the second focus signal value to the first focus signal value under state in which the focus lens 115 is at position No. 2. At this time, the focus signal value is smaller than 1. This is because the focus signal value of position No. 2 is smaller than that of position No. 1. Accordingly, the current moving direction (namely, a moving direction from position No. 1 to position No. 2) is a direction away from the on-focus position. Thus, the camera 100 may move the focus lens 115 to position No. 3 that is in a direction opposite to the current moving direction of the focus lens.

Then, the camera calculates an amount of defocus at position No. 2 of the focus lens 115 by using the calculated focus signal ratio. At this time, an amount of defocus having a plus value is calculated. Then, the camera 100 may increase the moving speed, taking into consideration the amount of defocus, and move the focus lens 115 to position No. 5 via position Nos. 3 and 4.

When the focus lens 115 reaches position No. 5, the camera 100 may detect that the position is near to the on-focus position and perform a three-point interpolation. Specifically, the camera 100 may calculate the focus signal values at position Nos. 5, 6 and 7, respectively, and then calculate a point at which a line connecting focus signal values of position Nos. 5 and 6 intersects with a tangent line of the focus signal value of position No. 7, as shown in the upper graph of FIG. 12. At this time, it can be seen that the time interval necessary for performing the three-point interpolation is c/2.

Then, the camera 100 may determine, as an on-focus position, position No. 8 at which the two lines intersect with each other, and finally move the focus lens 115 to position No. 8.

Through the above process, the camera 100 performs auto focusing. In addition, as shown in FIG. 12, even when the initial moving direction of the focus lens 115 is a direction away from the on-focus position, the camera 100 may change the moving direction of the focus lens 115. It can be seen that the time necessary for focusing through the above process is approximately a time interval of 5c. Further, it can be seen that the speed at which the focus lens 115 is moved from position No. 2 to position No. 3 is higher than the speed at which the focus lens is moved from position No. 1 to position No. 2.

Thus, since the camera 100 may control the moving speed of the focus lens 115 depending on the amount of defocus, it is possible to obtain a focus in a shorter time than a case wherein the focus lens 115 is moved at constant speed.

While in the foregoing descriptions, embodiments have been described with reference to the camera 100 as an imaging apparatus, the teachings of the described embodiments can be practiced in any imaging apparatus capable of capturing a subject image and having an auto focusing function. For example, the imaging apparatus may include a camcorder, a digital camera and the like.

The foregoing embodiments and advantages are merely exemplary and are not to be construed as limiting the present invention. The present teaching can be readily applied to other types of apparatuses. Also, the description of the embodiments is intended to be illustrative, it will be appreciated by those skilled in the art that many changes, alternatives, modifications, and variations may be made without departing from the principles and spirit of the teachings of the present disclosure, the scope of which is defined in the appended claims and their equivalents.

What is claimed is:

1. An imaging apparatus comprising:
   a lens unit including an optical system having a focus lens;
   a driving unit that drives the lens unit;
   an image pickup unit that detects light having passed through the lens unit to generate an image signal;
   an auto focusing unit that calculates and outputs a plurality of focus signal values for a plurality of frequency bands of the image signal generated in the image pickup unit; and
   a control unit that calculates an amount of defocus of the focus lens, based on first focus signal values, which are the plurality of focus signal values at a first position of the focus lens, and second focus signal values, which are the plurality of focus signal values at a second position of the focus lens, and controls the driving unit so that a position of the focus lens is moved depending on the calculated amount of defocus.

2. The imaging apparatus according to claim 1, wherein the auto focusing unit comprises:
   an image processing unit that extracts a partial area of the image signal generated in the image pickup unit;
   a plurality of band pass filters that enables different frequency bands of the processed image signal to pass therethrough; and
   a focus signal value calculating unit that calculates and outputs focus signal values for image signals of the respective frequency bands having passed through the plurality of band pass filters, respectively.

3. The imaging apparatus according to claim 2, wherein the focus signal, value calculating unit calculates one focus signal value for an image signal, of one frequency band having passed through one of the band pass filters.

4. The imaging apparatus according to claim 2, wherein the band pass filters have a same band width and intermediate frequencies thereof are sequentially increased from a lowest frequency at a predetermined interval.

5. The imaging apparatus according to claim 2, wherein the focus signal values are contrast values of the image signals having passed through the band pass filters.

6. The imaging apparatus according to claim 1, wherein the control unit calculates a focus signal ratio (second focus signal value/first focus signal value) that is a ratio of the second focus signal value to the first focus signal value for each of the frequency bands and calculates amounts of defocus by using the focus signal ratios for the plurality of frequency bands.

7. The imaging apparatus according to claim 6, wherein when the focus signal ratios for the plurality of frequency bands are larger than or equal to 1, the control unit calculates an amount of defocus corresponding to a frequency band having the largest focus signal ratio of the focus signal ratios.

8. The imaging apparatus according to claim 6, wherein when the focus signal ratios for the plurality of frequency bands are smaller than 1, the control unit calculates an amount of defocus corresponding to a frequency band having the smallest focus signal ratio of the focus signal ratios.

9. The imaging apparatus according to claim 6, wherein the control unit determines a moving direction of the focus lens depending on whether the focus signal ratios for the plurality of frequency bands are larger than or equal to 1 or smaller than 1.

10. The imaging apparatus according to claim 1, wherein the first position is a previous position of the focus lens and the second position is a current position of the focus lens.

11. The imaging apparatus according to claim 1, wherein the control unit controls the driving unit so that the larger the calculated amount of defocus, a moving speed of the focus lens is higher.

12. An auto focusing method comprising:
    detecting light having passed through a lens unit to generate an image signal;
    calculating a plurality of focus signal values for a plurality of frequency bands of the generated image signal;
    calculating an amount of defocus of a focus lens, based on first focus signal values, which are the plurality of focus signal values at a first position of the focus lens, and second focus signal values, which are the plurality of focus signal values at a second position of the focus lens; and
    driving the focus lens so that a position of the focus lens is moved depending on the calculated amount of defocus.

13. The auto focusing method according to claim 12, wherein the focus signal value calculating comprises:
    extracting a partial area of the image signal generated;
    separating the processed image signal into image signals of a plurality of frequency bands by using a plurality of band pass filters enabling different frequency bands to pass therethrough, respectively; and
    calculating focus signal values for the image signals of the respective frequency bands separated by the plurality of band pass filters.

14. The auto focusing method according to claim 13, wherein focus signal value calculating comprises calculating one focus signal value for an image signal of one frequency band having passed through one of the band pass filters.

15. The auto focusing method according to claim 13, wherein the band pass filters have a same band width and intermediate frequencies thereof are sequentially increased from the lowest frequency at a predetermined interval.

16. The auto focusing method according to claim 13, wherein the focus signal values are contrast values of the image signal having passed through the band pass filters.

17. The auto focusing method according to claim 12, wherein the focus signal value calculating comprises calculating a focus signal ratio (second focus signal value/first focus signal value) that is a ratio of the second focus signal value to the first focus signal value for each of the frequency bands and calculating amounts of defocus by using the focus signal ratios for the plurality of frequency bands.

18. The auto focusing method according to claim 17, wherein the defocus amount calculating comprises, when the focus signal ratios for the plurality of frequency bands are larger than or equal to 1, calculating an amount of defocus corresponding to a frequency band having the largest focus signal ratio of the focus signal ratios.

19. The auto focusing method according to claim 17, wherein when the defocus amount calculating comprises, when the focus signal values for the plurality of frequency bands are smaller than 1, calculating an amount of defocus corresponding to a frequency band having the smallest focus signal ratio of the focus signal ratios.

20. The auto focusing method according to claim 17, wherein the focus lens driving comprises determining a moving direction of the focus lens depending on whether the focus signal ratios for the plurality of frequency bands are larger than or equal to 1 or smaller than 1.

21. The auto focusing method according to claim 12, wherein the first position is a previous position of the focus lens and the second position is a current position of the focus lens.

22. The auto focusing method according to claim 12, wherein the focus lens driving comprises driving the focus lens so that the larger the calculated amount of defocus, a moving speed of the focus lens is faster.

* * * * *